United States Patent
Rudolph

(10) Patent No.: US 9,792,829 B2
(45) Date of Patent: Oct. 17, 2017

(54) SYSTEM AND METHOD FOR CONDUCTING MULTI-LAYER USER SELECTABLE ELECTRONIC TESTING

(71) Applicant: Laurence Rudolph, Herndon, VA (US)

(72) Inventor: Laurence Rudolph, Herndon, VA (US)

( * ) Notice: Subject to any disclaimer, the term of this patent is extended or adjusted under 35 U.S.C. 154(b) by 0 days.

(21) Appl. No.: 15/350,842

(22) Filed: Nov. 14, 2016

(65) Prior Publication Data
US 2017/0061810 A1    Mar. 2, 2017

Related U.S. Application Data

(62) Division of application No. 14/682,817, filed on Apr. 9, 2015, now Pat. No. 9,530,329.

(Continued)

(51) Int. Cl.
*G09B 19/00* (2006.01)
*G09B 7/077* (2006.01)
(Continued)

(52) U.S. Cl.
CPC .............. *G09B 7/077* (2013.01); *A41G 1/00* (2013.01); *G09B 7/00* (2013.01); *G09B 7/02* (2013.01);
(Continued)

(58) Field of Classification Search
USPC .......................... 434/308, 318, 322, 323, 353
See application file for complete search history.

(56) References Cited

U.S. PATENT DOCUMENTS

| 5,657,256 A | 8/1997 | Swanson et al. |
| 6,173,154 B1 | 1/2001 | Kucinski et al. |

(Continued)

FOREIGN PATENT DOCUMENTS

| WO | 9832109 A1 | 7/1998 |
| WO | 1998032109 A1 | 7/1998 |

OTHER PUBLICATIONS

Gardner-Medwin, A.R. and M. Gahan, Formative and Summative Confidence-Based Assessment,: (2003), Proc. 7th International Computer-Aided Assessment Conference, Loughborough, UK.
(Continued)

*Primary Examiner* — James Hull
(74) *Attorney, Agent, or Firm* — J.A. Lindeman & Co., PLLC

(57) ABSTRACT

A multi-layer user-selectable electronic testing (MUSET) system provides a cascaded set of alternative testing formats for test-takers to select a testing format that best accommodates their level of ability. Test-takers can answer fill-in-the-blank (FITB) items on a computer or other input device. If the test-taker is less confident of their understanding, they can select multiple-choice (MC) or true/false (T/F) testing formats. The MUSET system measures, tracks, and stores the amount of time it takes to answer test items, to switch testing formats, and to change answers. Test-takers indicate a confidence level that they have in the correctness of their answer. The MUSET system determines confidence characteristics, latency characteristics, and hesitancy characteristics of the test-taker and gathers additional parameters to build a performance profile of the test-taker's skills/traits/abilities. The performance profile is analyzed to guide and inform evaluators regarding individual performance, trends over time, differences between test-taker subsets, and analyses of test items.

11 Claims, 12 Drawing Sheets

Related U.S. Application Data

(60) Provisional application No. 61/977,988, filed on Apr. 10, 2014.

(51) Int. Cl.
  *G09B 7/02* (2006.01)
  *G09B 7/06* (2006.01)
  *G09B 7/00* (2006.01)
  *A41G 1/00* (2006.01)
  *G09B 19/02* (2006.01)

(52) U.S. Cl.
  CPC ............... *G09B 7/06* (2013.01); *G09B 19/00* (2013.01); *G09B 19/0046* (2013.01); *G09B 19/025* (2013.01)

(56) References Cited

U.S. PATENT DOCUMENTS

| | | |
|---|---|---|
| 6,461,166 B1 | 10/2002 | Berman |
| 6,648,651 B1 | 11/2003 | Cadman et al. |
| 7,149,468 B2 | 12/2006 | Patz et al. |
| RE39,942 E | 12/2007 | Fai et al. |
| 7,818,185 B2 | 10/2010 | Bjorner et al. |
| 8,046,251 B2 | 10/2011 | Scarborough et al. |
| 8,165,518 B2 | 4/2012 | Smith et al. |
| 8,265,977 B2 | 9/2012 | Scarborough et al. |
| 8,340,982 B2 | 12/2012 | Bjorner et al. |
| 9,002,671 B2 | 4/2015 | Kan et al. |
| 2002/0182579 A1* | 12/2002 | Driscoll ............... G09B 7/02 434/350 |
| 2003/0077559 A1* | 4/2003 | Braunberger ............ G09B 7/00 434/322 |
| 2003/0177347 A1* | 9/2003 | Schneier ................. A63F 13/12 713/151 |
| 2004/0014016 A1* | 1/2004 | Popeck ................... G09B 7/02 434/322 |
| 2006/0282306 A1 | 12/2006 | Thissen-Roe |
| 2008/0026359 A1 | 1/2008 | O'Malley |
| 2009/0070111 A1* | 3/2009 | Bajaj ..................... G06F 17/274 704/251 |
| 2011/0279228 A1 | 11/2011 | Kumar |
| 2012/0208166 A1 | 8/2012 | Ernst et al. |
| 2014/0024009 A1 | 1/2014 | Nealon et al. |

OTHER PUBLICATIONS

Yen et al., "Development and Evaluation of a Confidence-Weighting Computerized Adaptive Testing," (2010), Educational Technology & Society, 13 (3), pp. 163-176.

Gardner-Medwin, A.R., "Confidence-Based Marking—towards deeper learning and better exams," Chapter 12 in Bryan C. and Clegg K. (eds) (2006), Innovative Assessment in Higher Education, Routledge, Taylor and Francis Group Ltd., London.

* cited by examiner

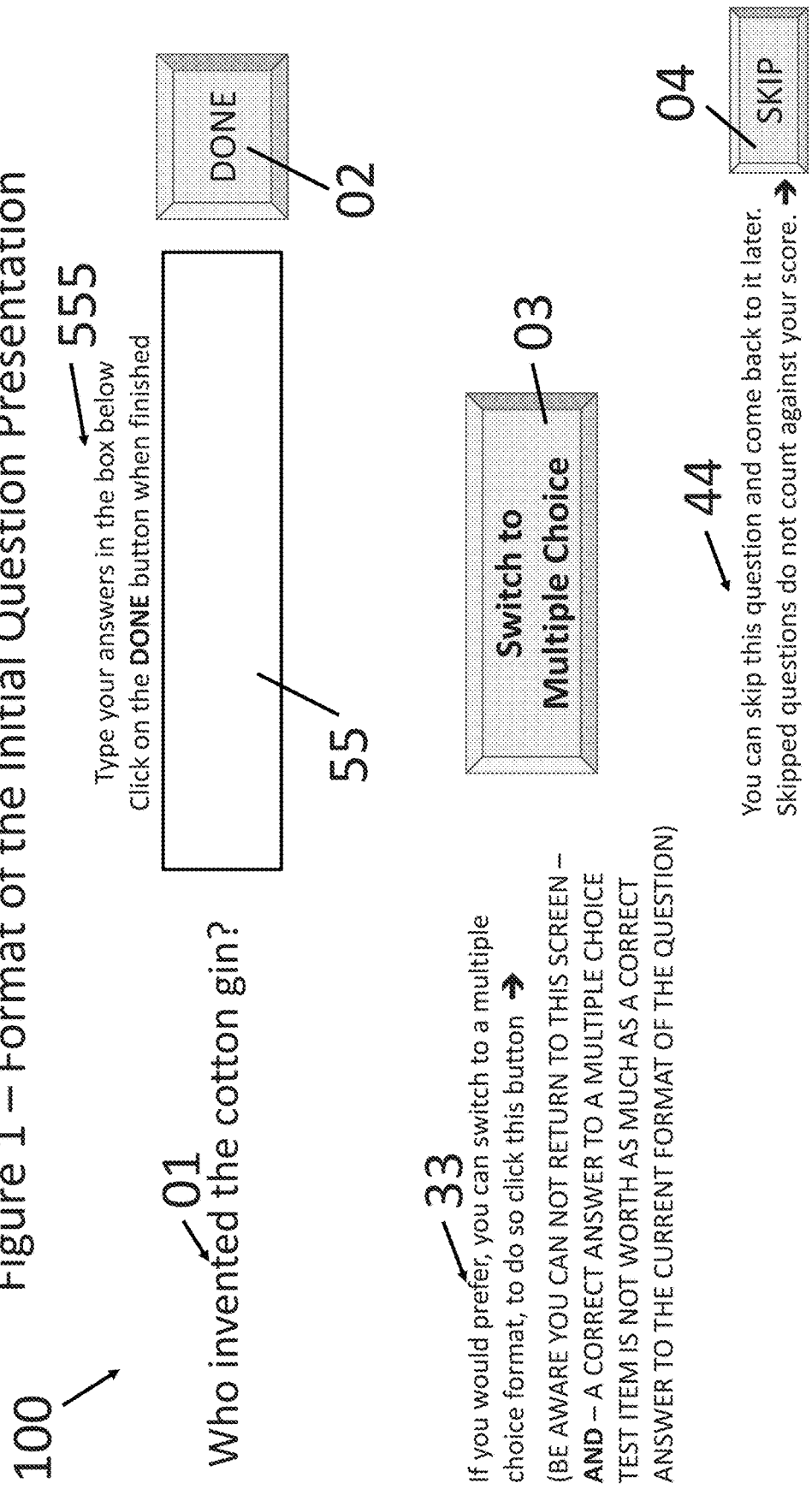

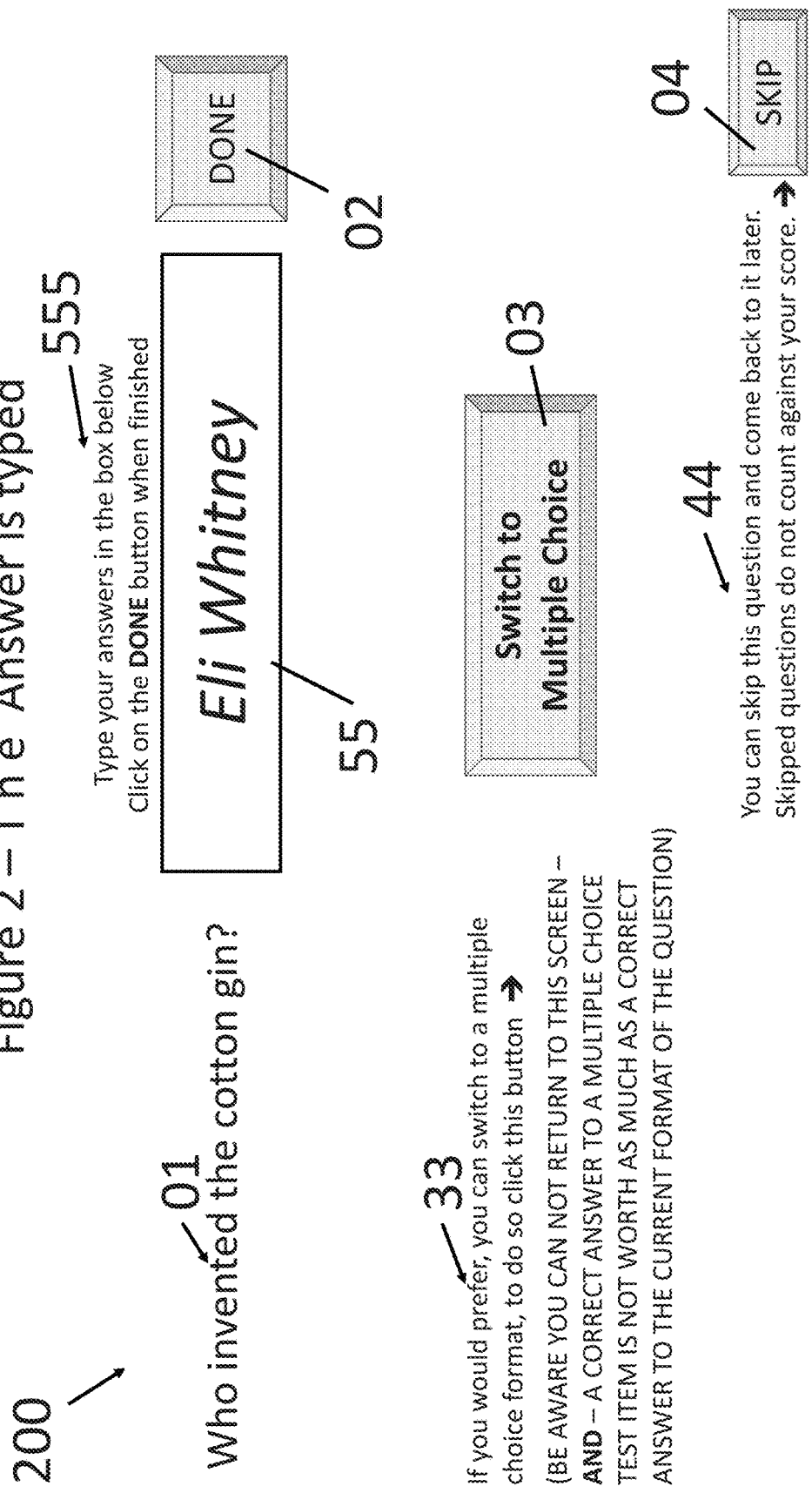

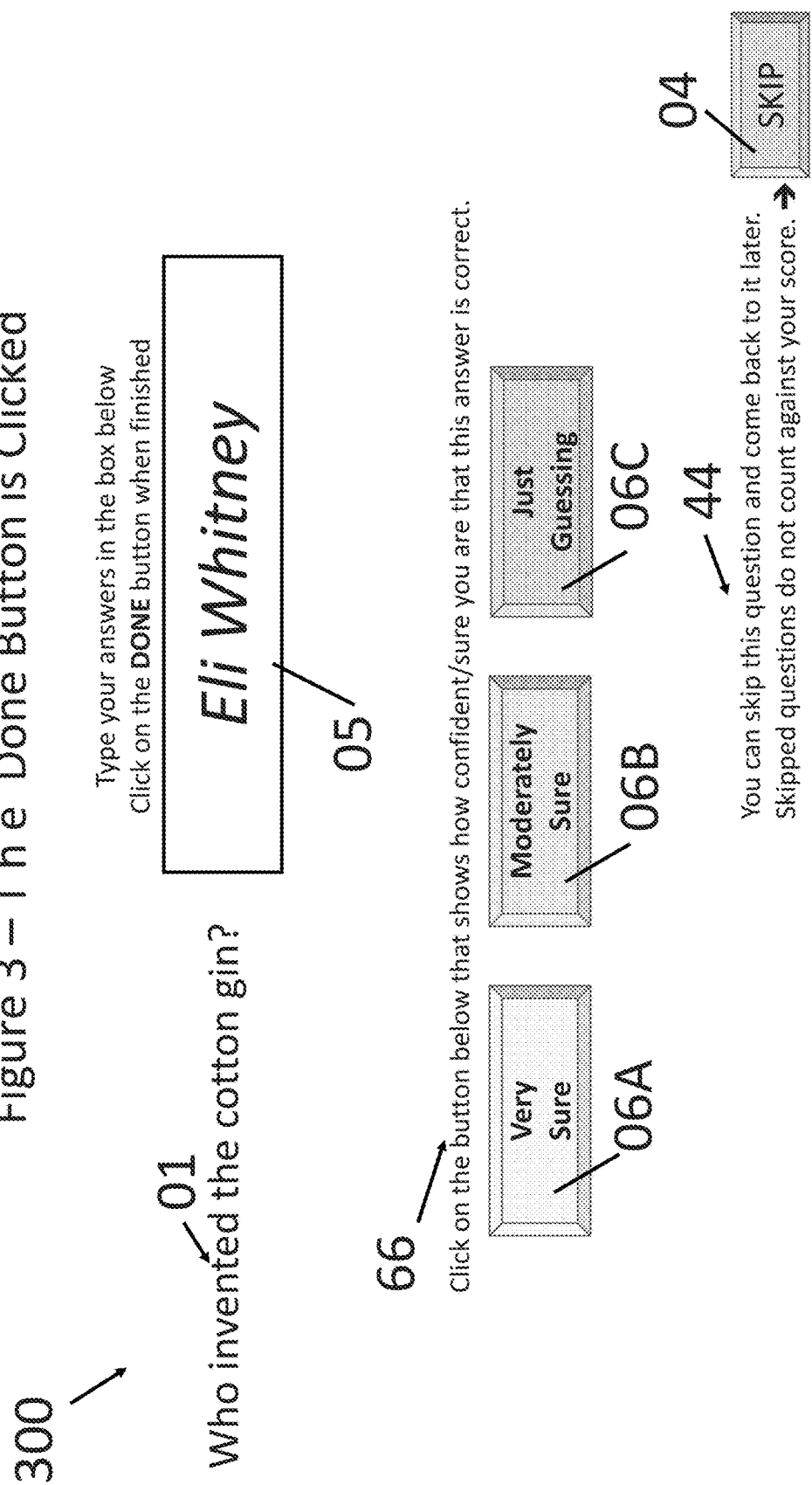

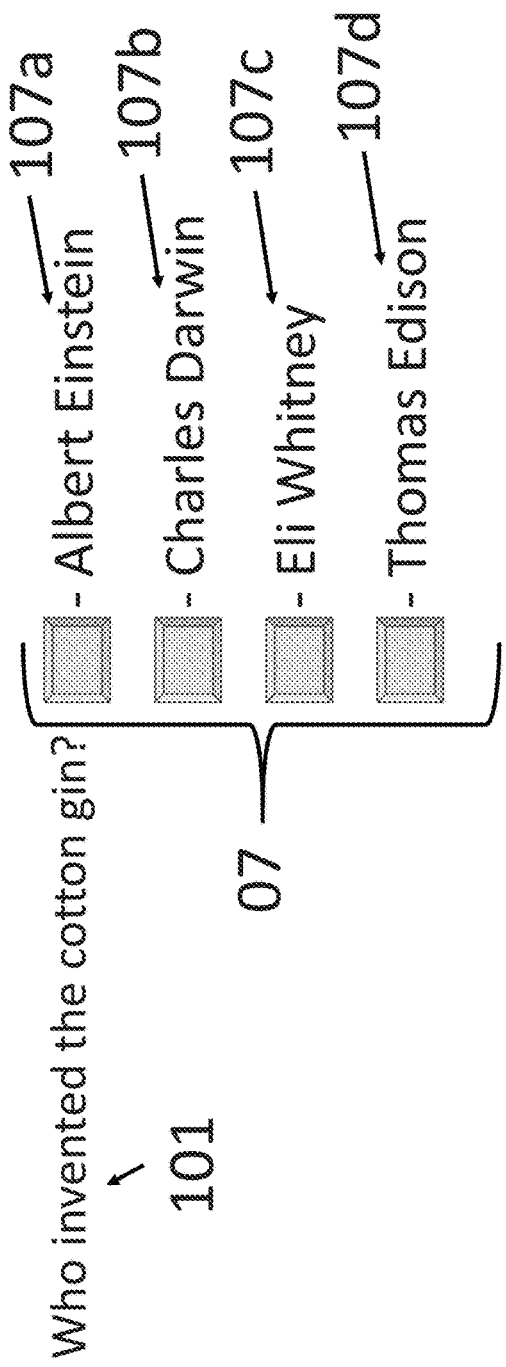
Figure 4 – Multiple Choice Option Selected

Figure 5 – Answer is Chosen

Who invented the cotton gin? — 101

☐ - Albert Einstein — 107a
☐ - Charles Darwin — 107b
☒ - Eli Whitney — 107c
☐ - Thomas Edison — 107d

500

Click on the button below that shows how confident/sure you are that this answer is correct.

[Very Sure] — 06A
[Moderately Sure] — 06B
[Just Guessing] — 06C

66

[SKIP] — 04

You can skip this question and come back to it later. Skipped questions do not count against your score.

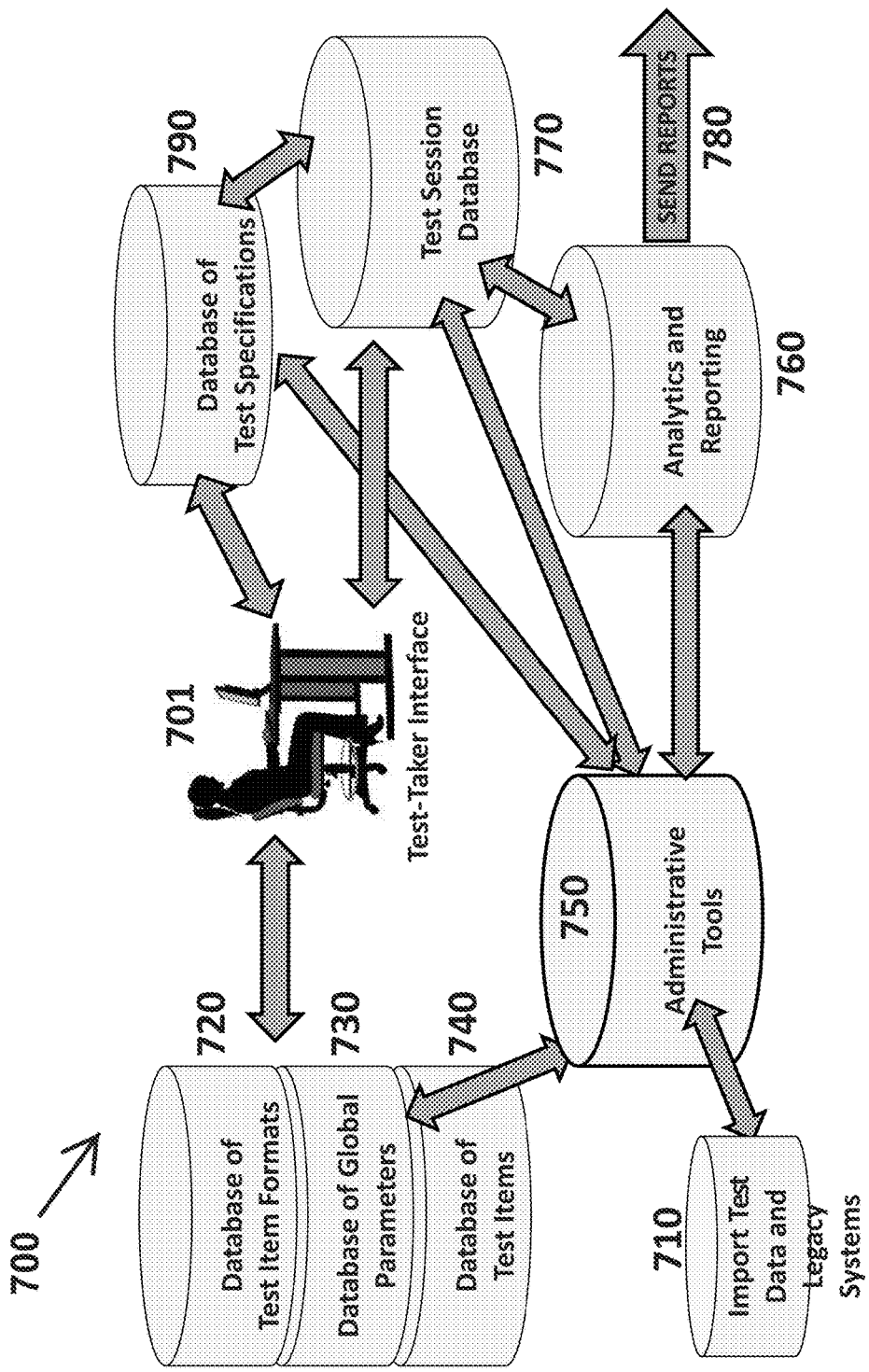
Figure 7 – MUSET System

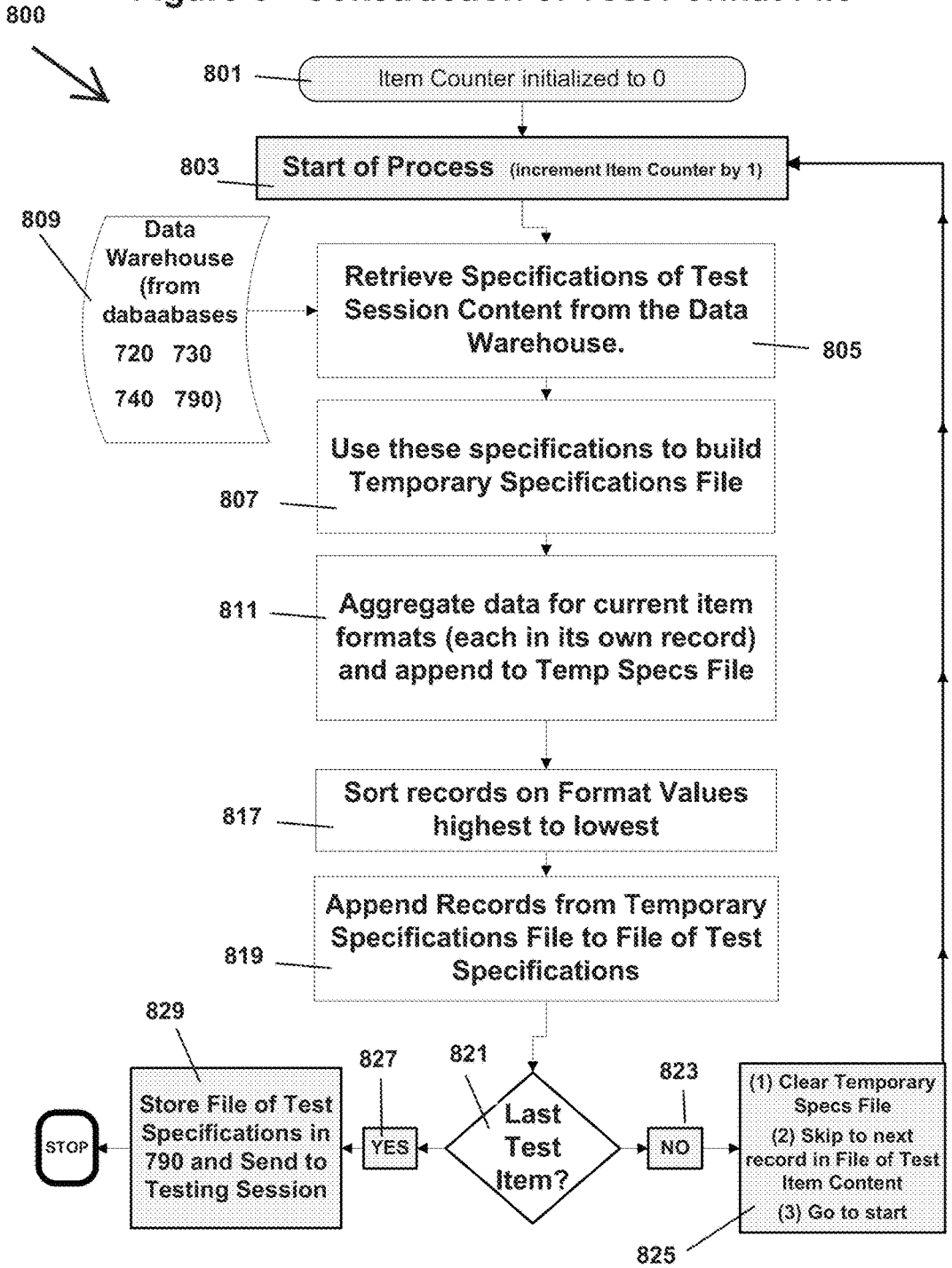

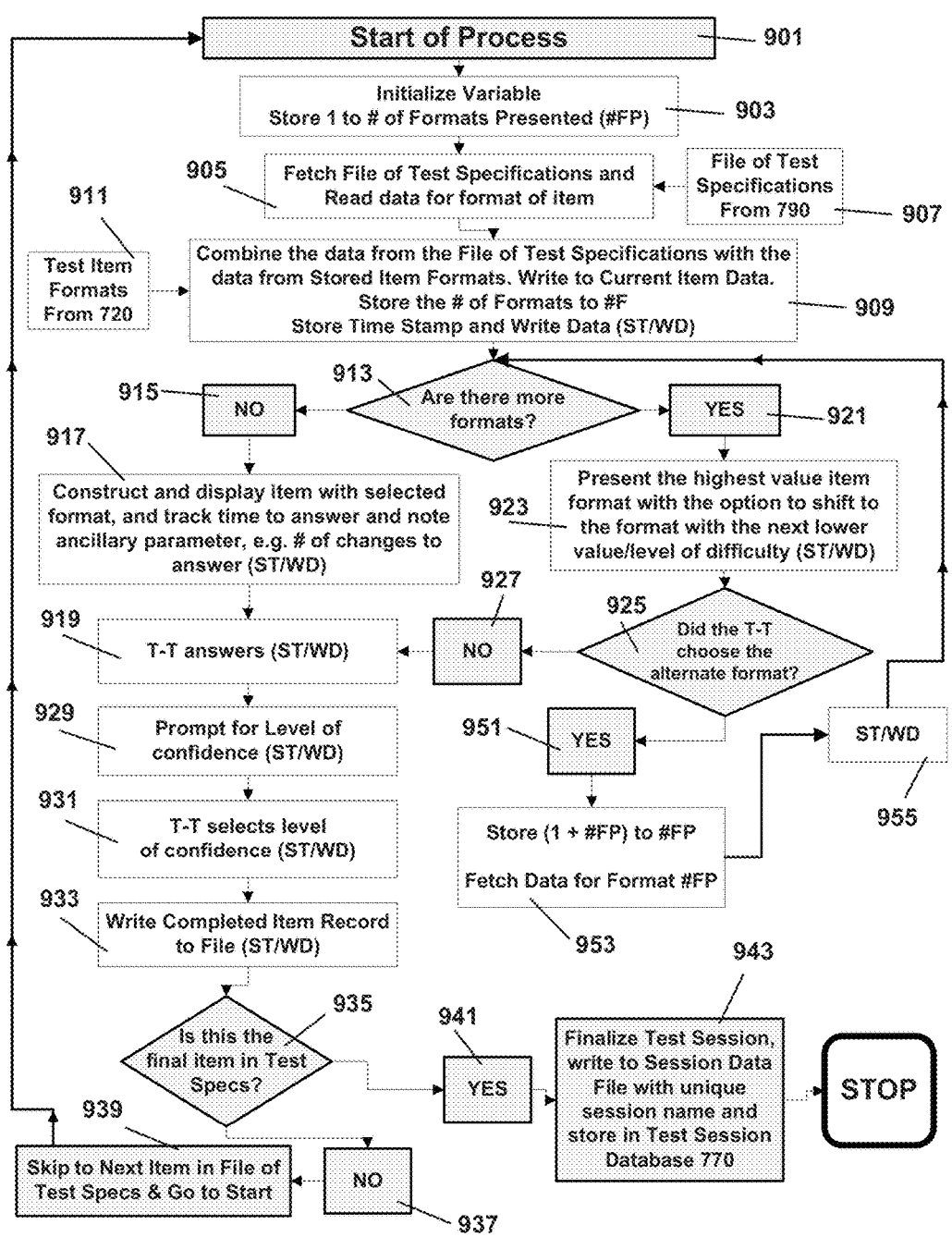

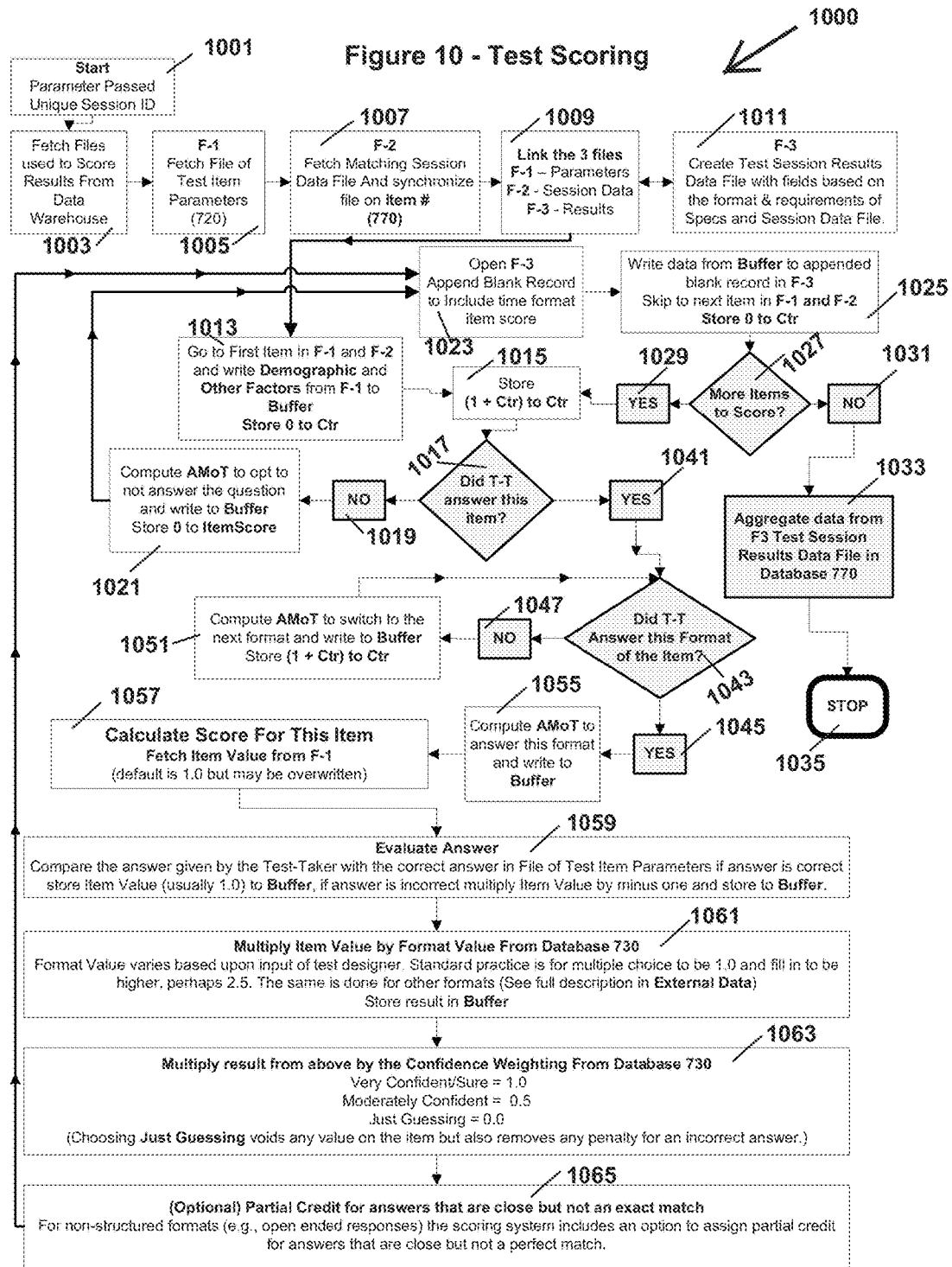

Figure 11A
Format 1: In the space below, use the stylus provided to draw an equilateral triangle.
Figure 11B
Format 2: In the spaces below, type the number of degrees in each of the three interior angles of an equilateral triangle.
(1) _____ (2) _____ (3) _____
Figure 11C
Format 3: Which of the four objects below is an equilateral triangle?
a. 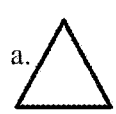  b.   c. 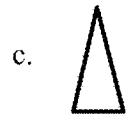  d. 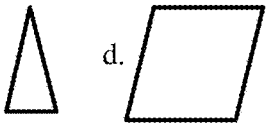

Format 4: How many degrees are there in each of the three interior angles of an equilateral triangle?

A) 30        B) 60        C) 90        D) 180

Format 5: The object below is an equilateral triangle?(T/F)

Format 6: Each of the interior angles of an equilateral triangle is 60 degrees. (T/F)

SYSTEM AND METHOD FOR CONDUCTING MULTI-LAYER USER SELECTABLE ELECTRONIC TESTING

CROSS-REFERENCE TO RELATED APPLICATIONS

This application is a divisional application of U.S. patent application Ser. No. 14/682,817, filed on Apr. 9, 2015. This application claims the benefit of priority of U.S. application Ser. No. 14/682,817, filed on Apr. 9, 2015, and of U.S. Provisional Application No. 61/977,988, filed on Apr. 10, 2014. The entire contents of U.S. patent application Ser. No. 14/682,817, filed on Apr. 9, 2015, and U.S. Provisional Application No. 61/977,988, filed on Apr. 10, 2014, are incorporated by reference.

TECHNICAL FIELD

This technology relates to computerized adaptive testing systems and methods. More particularly, the technology relates to systems, devices, and methods of testing and assessment that provide accurate and precise sets of test item data and test-taker data, subject to rigorous quality control, and information and metrics upon which to make professional, educational, employment, and personnel decisions and administer programs.

BACKGROUND

Multiple-choice tests (MCTs) have been used for many years to determine the presence or absence of a skill/trait/ability, but there are limitations to these types of tests. One limitation results from the impact of randomness, or "guessing" by the test-taker. For example, a four-option MCT item has a 25% chance of being answered correctly, even when the test-taker is guessing. Past efforts to suppress guessing by subtracting the number of incorrect answers from the number of correct answers, however, suffer from the possibility that a test-taker might hesitate to answer an item that the test-taker was less than completely sure of, even if the answer being considered was correct.

Another limitation is the inferred knowledge from a MCT. The amount of knowledge displayed by selecting a correct answer from a list of presented options is significantly less than the amount of knowledge demonstrated by providing a correct answer to a fill-in-the-blank (FITB) item where the test-taker supplies the answer without having the benefit of any prompts. Tests using FITB items have a different set of problems, however. For example, FITB items are thought to be challenging to machine score, as slightly misspelled answers are at risk of being marked as incorrect. These tests are time consuming to hand score and hand scoring is open to human error. In addition, FITB items answered incorrectly do not reflect the possibility that the test-taker might have been able to select the correct answer when presented in a MCT format.

Another concern is driven by the potential for testing bias, which might expose the testing entity and/or the test assessment entity to potential legal action. In cases where a set "cut" score is used in assessments and decision-making, even a small amount of bias might lead to incorrect judgments and biased results, thereby raising questions as to the validity of using such tests to make certain kinds of decisions. The amount and types of information obtained in the testing sessions often fall short of what is needed to identify and address these concern for bias and validity.

SUMMARY

The Multi-Layer User Selectable Electronic Testing (MUSET) of the claimed invention addresses the above concerns by using computer-based testing, stored-data retrieval, and various data elements and parameters to present a cascaded set of alternative testing formats that allow the test-taker to select the format (e.g., FITB or MC or true/false T/F), that best accommodates their level of ability for any given question or series of questions. For some questions, the test-taker might feel comfortable in answering an FITB item by typing on a computer terminal or other input device. If the test-taker is less confident of their understanding of a particular question or series of questions, however, they might select a MC or a T/F format. Other modes of answering may include (but are not limited to) spoken answers, drawn answers, sign language responses, assembly/ordering of objects, or accessing the Internet to demonstrate the ability to retrieve specified results. The MUSET system provides a computer-implemented solution to technical problems that may arise with existing testing methodologies, including problems related to improperly characterizing or evaluating the test-takers themselves.

When the test-taker uses a process of the claimed invention, the monitoring capability of the MUSET system measures and stores testing parameters and test-taker parameters beyond the single issue of whether a particular question is answered correctly, and then uses those parameters to construct a robust performance profile of the test-taker. For example, the MUSET system measures, calculates, and stores the amount of time it takes to answer the test item(s). Additionally, a test-taker can choose from a number of presented options to indicate a level of confidence that the test-taker has in the correctness of their answer. The system also gathers additional data elements and parameters to enhance the understanding of the test-taker's skills/traits/abilities, as well as evaluating the strengths and weakness of the presented test items and the testing environment. The collected, measured, and analyzed data elements and parameters serve to distinguish test-takers that may have the same "raw" test score.

In addition, the systems and processes of the claimed invention take advantage of sophisticated auto correction algorithms to process, evaluate, and characterize manually-entered text. The claimed invention also capitalizes on advances in the automated scoring of FITB responses, which has presented significant challenges to date.

At each step in the claimed processes, data are captured, measured, and stored in a rigorously-designed relational data warehouse (Test Session Database) to ensure that the MUSET system is functioning properly. In addition, the MUSET system is able to continually update the test-taker's progress and place in responding to test items during the course of a testing session in order to ensure that the session can be resumed in the event of a disruption or planned break in the process. Additional data elements and parameters described below (including confidence, latency, hesitancy, etc.) are calculated, stored, and aggregated in the data warehouse to support meta-analyses that can guide evaluators, decision makers, and administrators of the test and its applications. A robust set of metrics are calculated to populate reports and dashboards to guide and inform evaluators reflecting numerous perspectives of individual performance, trends over time, differences between relevant demographic subsets of the test-takers, and analyses of individual test items or groups of test items. Likewise, test results and performance profiles of test-takers and groups of test-takers that take a particular test or examination multiple times can be compared to identify similarities and differences among the test-takers and among the tests or examinations.

The systems and methods of the claimed invention can be adapted to be administered by persons trained to deliver the test in person or over video links. These options might be useful in testing individuals with disabilities that might make direct computer-based testing difficult or impossible. In such situations, the test administrator can present a free-form question and ask the test-taker to answer in spoken words, written words, drawings, the assembly or arrangement of objects, or other formats and modalities. If the test-taker chooses, the test administrator can read or otherwise present a list of four alternatives from which the test-taker could select an answer. The same format and modality can be used to solicit the confidence level parameter. It would then be the job of the test administrator to enter the responses into a protocol on a computer that will be used in a similar system to score, report and interpret the results. By using a computer running the processes of the MUSET system to electronically enter the test-taker's responses, the timing of test-taker choices allows similar metrics to be captured and support the calculation of latency and hesitancy metrics.

The MUSET system and methods interactively adapt testing sessions to the test-taker on an item-by-item basis or over a series of items. The multi-layer user-selectable cascading test formats provide a dynamically-changing testing session that afford test-takers the ability to demonstrate their understanding, knowledge, skills, and abilities in a number of different formats not possible in traditional testing environments.

In one example embodiment of the claimed invention, a multi-layer user-selectable electronic testing process executes on a MUSET computer system to build an electronic test-taker performance profile. The computer processor of the system executes the steps of receiving an electronic test item response to a test item that is presented to a test-taker. The electronic test item response is stored in an item response database, and a determination is made when the electronic test item response is indicative of a correct answer.

The computer processor then executes the steps of receiving a test item response confidence level indicating the test-taker's confidence in the correctness of the electronic test item response and storing the test item response confidence level in the item response database. The confidence level can include a confidence ratio calculated based upon the test-taker's indicated confidence level for correct answers and the test-taker's indicated confidence level for incorrect answers.

The computer processor executes additional steps that include determining an amount of time required for the test-taker to provide the electronic test item response after the test item was presented to the test-taker and calculating a latency score based upon the determined amount of time required for the test-taker to provide the electronic test item response. A number of changes to the electronic test item response that the test-taker makes before submitting the electronic test item response for receipt is determined, and a hesitancy score is calculated based upon the number of changes to the electronic test item response that the test-taker makes. The computer processor then executes additional steps that include building an electronic performance profile of the test-taker based upon a number of correct answers, the confidence level of the electronic test item response, the latency score, and the hesitancy score.

Additionally, the computer processor can execute additional steps including receiving demographic information of the test-taker and further building the electronic performance profile of the test-taker based upon the demographic information.

Likewise, the computer processor can execute additional steps including receiving biometric measurements of the test-taker and further building the electronic performance profile of the test-taker based upon the biometric measurements.

The computer processor can execute additional steps including creating a weighted computed score of the number of correct answers based upon a test item format value and/or a test item difficulty value. The item difficulty value can be based upon the value of the test item formats for test items that were correctly answered and the value of the test item formats for test items that were incorrectly answered.

In one embodiment of the claimed invention, the computer processor can execute additional steps including receiving a test item parameter file F1 from a database of global parameters, receiving a testing session data file F2 from a test session database, synchronizing the test item parameter file F1 and the testing session data file F2, and creating a test session results file F3 based on the test item parameters file F1 and the session data file F2. The test session results file F3 can include a type of a test item format, the amount of time required for the test-taker to provide the electronic test item response, the confidence level, and/or a computed score for the test item. The computer processor can execute additional instructions including updating the test session results file F3 with the latency score and updating the test session results file F3 with the hesitancy score.

In one embodiment of the claimed invention, a computer processor executes the steps of delivering a multi-layer user-selectable electronic test that provides a cascaded set of alternative test item formats to test-takers. The computer processor can execute the steps of delivering an electronic test item from a test item database to a test-taker on a display device in an initial test item format, receiving a selection from the test-taker to switch from the initial test item format to an alternative test item format, and transforming the initial test item format with a test item format database to an acceptable alternative test item format for the electronic test item. The computer processor then executes the step of delivering the electronic test item to the test-taker on the display device in the acceptable alternative test item format.

The computer processor can execute additional steps including receiving an electronic test item response to the electronic test item displayed to the test-taker in the acceptable alternative test item format, determining when the received electronic test item response is indicative of a correct answer, calculating a test item score for the received electronic test item response, and weighting the calculated test item score by an alternative testing format value that is based on the relative difficulty of the alternative testing format and the initial test item format. The initial test item format can includes a fill-in-the-blank format, and the alternative test item format can include a multiple choice format. The computer processor can execute additional steps including receiving an electronic test item response from the test-taker to the delivered electronic test item.

The computer processor can execute additional steps including receiving a second selection from the test-taker to switch to a second alternative test item format, transforming the acceptable alternative test item format with a test item format database to a second acceptable alternative test item format for the electronic test item, and delivering the electronic test item to the test-taker on the display device in the second acceptable alternative testing format. The computer processor can also execute additional steps including receiving an electronic test item response from the test-taker to this delivered electronic test item. The initial test item format can include a fill-in-the-blank format, the alternative test item format can include a multiple choice format, and the second acceptable alternative test item format can include a true-false format. Also, the electronic test item can include a format type, a content presentation, a correct answer specification, and/or a specification of tracked parameters.

Transforming the initial test item format to an acceptable alternative test item format can include transforming the initial test item format with test specifications from a database of test specifications.

BRIEF DESCRIPTION OF THE DRAWINGS

FIG. 1 shows a computer monitor displaying an initial fill-in-the-blank (FITB) testing format in accordance with the claimed invention.

FIG. 2 shows a computer monitor when a test-taker enters an answer in the fill-in-the-blank (FITB) testing format of FIG. 1.

FIG. 3 shows a computer monitor display after a test-taker submits the answer using the fill-in-the-blank (FITB) testing format of FIG. 1.

FIG. 4 shows a computer monitor display when a test-taker selects a multiple choice (MC) testing format in accordance with the claimed invention.

FIG. 5 shows a computer monitor display when a test-taker selects an answer in the multiple choice (MC) format.

FIG. 7 shows a system overview of the multi-layer user-selectable electronic testing (MUSET) system in accordance with the claimed invention.

FIG. 8 shows a process flow chart of a process to construct a test format file in accordance with the claimed invention.

FIG. 9 shows a process flow chart of a testing session process in accordance with the claimed invention.

FIG. 10 shows a process flow chart of the scoring process of the test data in accordance with the claimed invention.

FIGS. 11A-11F show example formats designed to assess a test-taker's knowledge of equilateral triangles.

DETAILED DESCRIPTION

Figure 6:
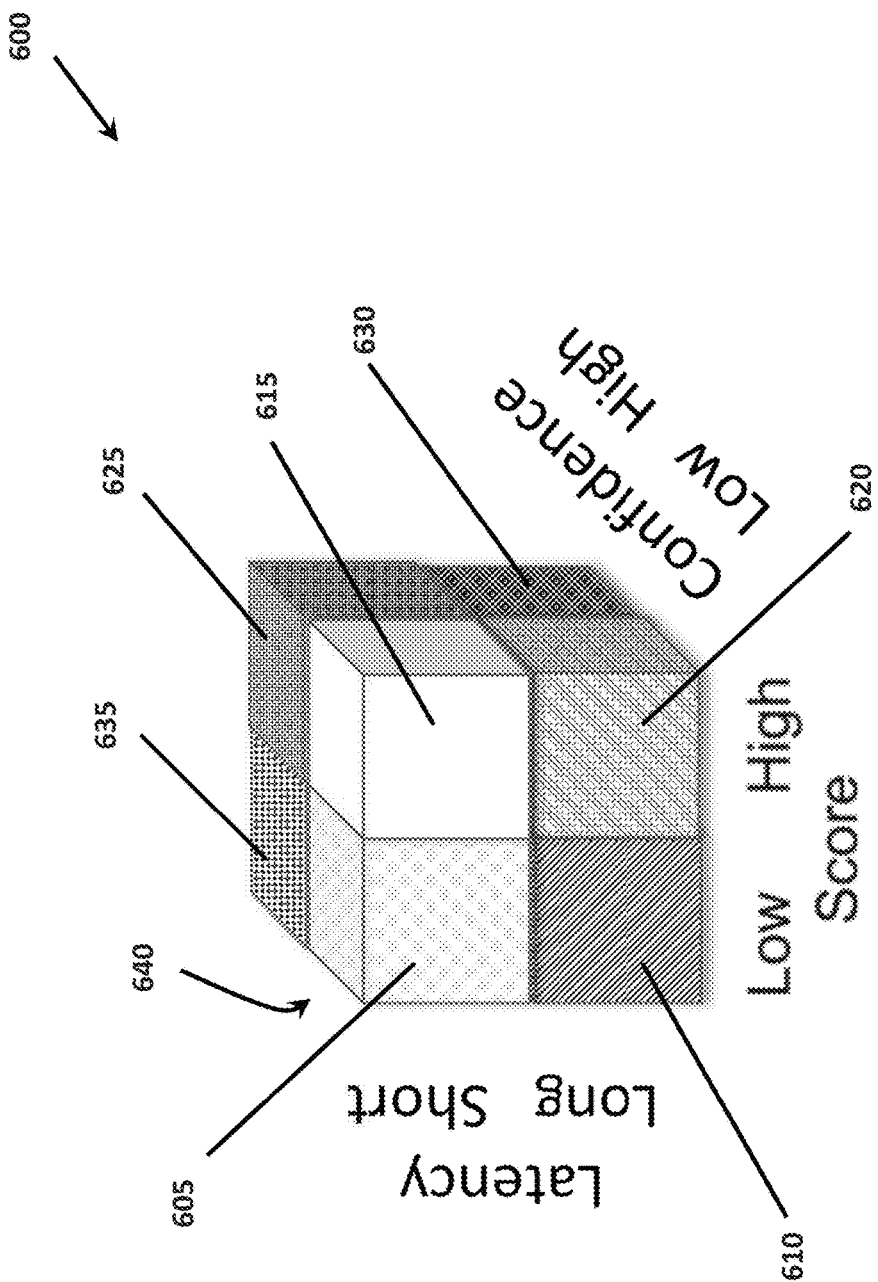
FIG. 6 is an example visual representation of a test-taker's performance profile built using three example metrics that result in eight possible performance profile outcomes.
Figures 11D, 11E, 11F:

The Multi-Layer User-Selectable Electronic Testing (MUSET) system of the claimed invention adds improvements and enhancements to testing models. Traditional testing models have been limited for a given test item to a single mode (e.g., multiple choice, fill in the blank, etc.). However, the MUSET system can include a wide range of different formats for each individual test item. For example, a test item designed to assess the test-taker's knowledge of equilateral triangles can offer a set of formats such as those shown in FIGS. 11A-11F.

The complexity of the claimed process increases with the number of available formats used to display the test items and the ways of answering the test items. For brevity and simplicity, the description of the MUSET system's User Interface presented below includes an example of a two-layer model, which shows the distinctive qualities of the MUSET system but limits the complexity. Other process flowcharts presented below describe the claimed processes of the MUSET system with a more complete range of options.

The claimed invention collects additional data not only to enhance the value of the test-taking results but also to aid in decisions based upon the test-taker's performance. These data can include, but are not limited to, the test-taker's indicated level of confidence in the correctness of their answer (confidence level), the amount of time it takes to answer the test item (latency), the number of changes the test-taker makes before selecting the final answer (hesitancy), and biometric data (for example, heart rate, galvanic skin response, eye movements, etc.) that are intended to give insight into such traits as the test-taker's level of anxiety. These data elements and parameters can then be used in conjunction with the responses to the test items (i.e., answers) to build a performance profile of the test-taker.

As outlined above, the MUSET processes of the claimed invention allow the selection of many test item formats, depending on the particular testing goal. For each of the test item formats, the system collects an array of ancillary data. The description of the User Interface below is limited to a two-layer example of fill-in-the-blank (FITB) format questions with the option to switch to a multiple-choice (MC) format. There are three ancillary data elements (confidence, latency and hesitancy) captured and measured in this example. Additional cascaded layers of test item formats also can be used, and additional data elements can be captured and measured (e.g., biometric data and the like) depending upon the testing goal.

User Interface

The user interface (UI) of the MUSET system is described below in Example 1. The user interface provides a wide range of testing formats, both in the presentation of the test items (e.g., test questions) and in the range of response and actions for which the test-taker is evaluated. In Example 1, the description will be limited to a test item with two formats. This simplified example demonstrates the ability of the MUSET system to present more than one test item (question) format and to collect enhanced data elements (e.g., test-taker confidence levels).

Example 1—User Interface with Two Testing Formats

The M in MUSET refers to the ability to offer multiple layers of item formats for a given test item, presented as a cascaded set of alternative formats. The initial screen 100 seen in FIG. 1 presents the first layer using a FITB item format. The first test question 01 is presented to the test-taker along with an answer box 55 and text 555 providing instructions for answering initial question 01. When an answer is typed into answer box 55, the test-taker can press the "Done" button 02 to submit the answer.

FIG. 2 shows the computer display screen 200 that appears when the test-taker responds to the FITB test item presented in FIG. 1. Typing an answer 05 in the answer box 55 does not alter the testing display screen 200. When the test-taker submits their answer 05 by clicking on the "Done" button 02, the MUSET process stores the submitted answer 05 and switches to the display 300 shown in FIG. 3. The test-taker is prompted with the instructional text 66 "Click on the button below that represents how confident/sure you are that this answer is correct." There are three option buttons presented: "Very Sure" 06A, "Moderately Sure" 06B, and "Just Guessing" 06C. When one of the three buttons, 06A, 06B, or 06C, is selected, the test item is completed and the next test item appears.

If the test-taker does not know the answer to the FITB format question, they have the option of switching to a multiple-choice (MC) format. FIGS. 1 and 2 show button 03 labeled "Switch to Multiple Choice." Text 33 provides the test-taker a description of what will occur when the test-taker selects button 03.

When a test-taker elects to switch to MC format and selects button 03 in FIG. 1 or 2, the FITB format disappears and a four-option multiple-choice format 07 is displayed, as shown on the displayed screen 400 in FIG. 4. Question 101 is displayed along with four (multiple choice) options: 107*a*, 107*b*, 107*c*, and 107*d*. The test-taker selects one of these four options, and the display screen 400 switches to the displayed screen 500 shown in FIG. 5, which adds a set of confidence buttons, 06*a*, 06*b*, and 06*c*, similar to those in FIG. 3.

As shown in FIGS. 1-5, a button 04 is provided that allows the test-taker to "skip" the presented test item. For example, the button labeled "SKIP" 04 and the accompanying text 44 can provide a description to the test-taker of the option to go on to the next test item (question) without answering the current test item (question). Additional test-taker characteristics can be inferred when a test-taker skips a question. For example, those test-takers that skip questions may be more risk-averse than those test-takers that do not. Also, characteristics of the test items can be inferred when a test-taker skips a test item. For example, the test items may be confusing or the answer choices may not reflect a clear "best" answer.

As noted above, the claimed MUSET invention collects data elements and parameters in addition to the test-taker's answer (response to the test item). One of the additional test data elements is the test-taker's confidence in the correctness of the answer they are submitting, as discussed above. Example 1 shows how the level of confidence of the test-taker is acquired, measured, and stored by the MUSET system. The confidence level can then be used to build a performance profile of the test-taker. Another test data element, or test-taking factor, which is gathered by the MUSET system is latency, or the time it takes for the test-taker to respond to the test items presented. Latency measures can include the time it takes to type the answer (test item response) and press the DONE button in a fill-in-the-blank format, the time it takes to select the option to switch to a MC format option, the time it takes to indicate a level of confidence in the answer, and the like.

Other test-taking factors include counting the number of changes to an MC answer as an indication of hesitancy. Biometric data collected during the test-taking session can be useful in evaluating these and other test-taking factors. For example, infrared security cameras sensitive to skin temperature help ensure that a facial recognition process is not fooled by a photograph and can be used to measure the time interval of temperature changes in the test-taker's skin as an estimate of their pulse rate.

As noted above, FIGS. 3 and 5 show sets of confidence level buttons, 06A, 06B, 06C, from which the test-taker indicates their level of confidence in the correctness of the answer that they selected. Instructions presented at the beginning of the test session informed the test-taker of the impact this confidence level selection has on the way the answer is scored. The actual details of this scoring impact can be decided by the testing entity that implements the MUSET process. The specific scoring impact can vary based on the testing entity or evaluation entity's objectives. For example, the testing entity or evaluation entity can opt to give zero (0) credit on any item to a test-taker that chooses "Just Guessing" as their confidence level, even if the answer is correct. This scoring impact would be reasonable in some situations, since the test-taker had explicitly stated that the answer was arrived at by guessing.

Overview of MUSET System

FIG. 7 graphically displays the system framework of the MUSET system. The MUSET system 700 depicts the interactions of processes that run on the MUSET system and the source and destination components carrying out and affected by the processes. The MUSET system 700 can perform the processes of the claimed invention using a single computer/device or can substitute two or more computing systems or devices for any single device. Principles and advantages of distributed processing, such as redundancy, replication, and the like, also can be implemented as desired to increase the robustness and performance of the devices and systems. The system can also be implemented on tablet computer systems, handheld computing devices, smartphones, and other computing devices that extend across any network environment using any suitable interface mechanisms and communications technologies, including, for example, telecommunications in any suitable form (e.g., voice, modem, etc.); Public Switched Telephone Network (PSTNs); Packet Data Networks (PDNs); and the Internet, intranets, or a combination thereof, over any available network (LAN, WAN, WLAN, MAN, SAN, PAN, EPN & VPN).

The MUSET system is built upon a complex relational database with imbedded triggers and processes that perform the methods of the claimed invention. The MUSET system runs on client devices using server resources to deliver, process and store the content (e.g., test items, instructions, etc.) that is displayed and the results that are obtained. The clients can be browser-based HTML or platform specific applications running on IOS, Android, Windows, Linux, and others.

The individual system components shown in FIG. 7 are described below, reflecting the functional underpinnings of the MUSET system.

As shown in FIG. 7, Database of Test Item Formats 720 is a set of electronic templates that define how any given test item is displayed on a test-taker's computer screen and how the MUSET system 700 responds to the actions of the test-taker. The Database of Test Item Formats 720 houses instructions and processes that establish data fields and dictate actions based upon which data fields are acted upon by the test-taker. These formats define the initial presentation of the test item and the various actions available to the test-taker and can change based on the manner in which the test-taker responds. These actions include answering the test item, switching to a different testing format, skipping the test item, selecting the level of confidence that the test-taker has in their answer to the test item, and the like.

The Database of Global Parameters 730 is a set of values that are assigned to components of the MUSET and are used to present, analyze the performance of test-takers, and generate reports. These parameters are of two types: numeric values used in calculations, and the labels for these numeric values. If a particular test item is considered to be of higher or lower value, it can be assigned a value either greater or less than the default (in this example, 1.00). Default test format values are assigned to each of the many formats in which a given test item may be presented. For example, a default value for the multiple-choice format of a test item could be 1.00, while other test formats can be assigned a value greater than 1.00 if the format was thought to demonstrate a higher skill level (e.g., a fill-in-the-blank response could have a higher format value than a multiple-choice format). Likewise, other test formats can be assigned a format value less than 1.00 if the format was thought to demonstrate a lower skill level (e.g., true/false responses could have a lower format value than a multiple choice format).

There are also default values for the confidence levels that the test-takers may choose from (e.g., very sure, moderately sure, just guessing), and these confidence level default values can be changed if desired. Similarly, the nomenclature assigned to the test-taker actions, test item descriptions, confidence level descriptions, and the like can also be changed in the Database of Global Parameters 730. The same applies to the labels assigned to the components of the item formats. For example, the default label for the highest confidence choice is "Very Sure," but if desired it could be changed to "100% Confident" or some other label and the changed nomenclature stored in the Database of Global Parameters 730.

The Database of Test Items 740 is a repository of test items that can be selected to build a set of test items that comprise a test. These test items include one or more formats that can be included in a testing session. The formats are linked to the Database of Test Item Formats 720 and the Database of Global Parameters 730 to define what is displayed on the test-taker's screen 701, to specify what happens when the test-taker responds to the presented test item, and to specify the values (e.g., the item format value is 1.00 and the weighting for a confidence level of Moderately Confident is 0.75) that are assigned by the MUSET and are applied to the analysis and reporting.

Administrative Tools 750 is a set of programs, processes, and database triggers that are stored in a database and run by a computer processor that allow those who manage the MUSET system to add, delete, and modify components of the MUSET system. This includes adding/deleting/modifying individual test items, answers, and distractors (incorrect options) as well as the value of individual test items and the value of the test formats that are available for that item. Likewise, formats available for presentation to the test-taker (e.g., FITB, draw the answer, multiple choice) can also be added to/deleted/modified as can the labels associated with item formats, prompts, and navigation elements (e.g., buttons). Testing and test-taker reports, and their layout and parameters, can also be managed (add/delete/modify) using Administrative Tools 750. Administrative Tools 750 also include requests for the issuance of reports. (See Analytics and Reporting Database 760 below.)

Analytics and Reporting Database 760 is a set of analytic elements stored in a database and run by a computer processor that define how a given testing and evaluation parameter within the MUSET system is calculated. These parameters retrieve data stored in Test Session Database 770, described below. Analytics and reporting capabilities include reporting metrics such as mean, mode, median, standard deviation, and standard error of the measure. In addition, the MUSET system includes testing and evaluation metrics based on additional collected data, including data elements and parameters not found in traditional testing methods, such as average confidence, confidence ratio, average latency, average item difficulty, and item difficulty ratio as discussed below.

The MUSET system generates an array of reports with tools that allow administrators to tailor the contents of these report to the needs of different audiences, including reports for an individual test-taker; groups of test-takers; longitudinal studies; contrasting demographics (age, sex, years of education); and internal monitoring of the system integrity.

The test-taker's computer 701 is also connected to the Test Session Database 770. This is a data repository that tracks and captures the flow of information that the MUSET system uses to measure, score, analyze, and report its findings. The Test Session Database 770 tracks the progress of the test-taker throughout the testing session and continually collects and stores the testing parameters and data elements, including the test-taker's answers, latency measures, hesitancy measures, biometrics, and the like, so that the testing process can resume from the same point in the event of an interruption or a planned break.

The MUSET Analytics and Reporting System 760 has the facility to send reports to persons or entities outside the MUSET system via email and other processes via Send Reports link 780. The sending of these reports can be performed by the Administrative Tools Database 750.

The Database of Test Specifications 790 is a repository of test specifications stored and maintained on the MUSET computer system. When a test is designed within the MUSET, the design of the test is guided by a set of templates, programs and processes within the Administrative Tools 750. The test is an aggregation of test items that can be comprised of new test items or drawn from the Database of Test Items 740. The test will use formats stored in the Database of Test Item Formats 720 or new formats that are entered into that database. The test design processes also include the facilities of the Database of Global Parameters 730, where the test designers can specify or change the values applied in the testing session being constructed. Once the test is completely defined, it is codified as a file and stored in the Database of Test Specifications 790, for future use and analysis. Throughout the development of this new test, the computer system running the MUSET is updating the database structures and applying the rules, procedures and triggers that maintain the integrity of the MUSET.

MUSET System Processes

FIGS. 8-10 provide example test format file construction, testing session, and test scoring processes and algorithms carried out by the MUSET system 700.

Construction of the Test Format File

The construction of the test format file process 800 of the MUSET system is shown in FIG. 8. The process 800 utilizes the system components required to construct a test format data file, which specifies and electronically describes the testing session.

The Construction of the Test Format File process 800 begins with the initialization of an item counter, which is set to 0 in block 801. In block 803, the item counter is incremented to 1 as the process begins with the first test item. In block 807, a temporary specifications file is constructed one test item at a time from the Database of Test Item Formats 720, Database of Global Parameters 730, Database of Test Items 740, and Database of Test Specifications 790, contained in the MUSET system 700. Beginning with the first test item, the content, format, and scoring parameters are acquired from these databases and system and written to a temporary specifications file in block 807. In one embodiment of the invention, the temporary specifications file is built to include fields required to format, display and respond appropriately in the testing session. For example a test item format that required the test-taker to draw a geometric figure would test for the presence of an electronic stylus and specify an area on the computer screen where the drawing was to be placed. These requirements can vary based on the characteristics of each of the test items and their formats. There will be a separate record in the temporary specifications file for each test format included in a given test item. Each format of a test item defines a layer in the Multi-layer User Selectable Electronic Testing (MUSET) system. For example, a test item would be comprised of three records if three test item formats (e.g., FITB, MC, and T/F) were written for that test item. Each of these three formats represents a layer in the testing system.

Additional data elements and parameters related to the test-taker such as biometrics, demographics, and the like also may be used to build the temporary specifications file in block 807. This information can be acquired from the Database of Test Specifications 790 in the MUSET system 700. For example, when logging on to the MUSET system, the test-taker can be required to validate their identity using an assigned user ID and password, or some other means of identification (e.g., swipe of an ID badge, use of a fingerprint scanner, etc.), and these data elements could be specified for inclusion. Demographic information such as age, sex, race, job title, division in the company, or grade in school, can also be included in the temporary specifications file. Additional test-taker information and testing information can also be included in additional fields in the temporary specifications file to provide additional insight regarding the test-taker and the test. For example, job titles, company division names, grade in school, and other information can be included in the temporary specifications file. This information could be obtained from the test-taker as part of the login or obtained from the Administrative Tools 750.

In block 811, the MUSET test format file construction process continues and data for the current test item are aggregated. One record for each test format is constructed and then appended to the Temporary Specifications File in block 811. These records are sorted in block 817 based on their test format value. In one example embodiment, the records are sorted from highest test format value to lowest test format value (e.g., fill-in-the-blank format FITB has a higher test format value than a multiple choice MC format value).

In block 819, the process appends the records from the temporary specifications file to the file of test specifications from the Database of Test Specifications 790, which is the permanent storage file for these records.

The test format file construction process 800 checks to see if this is the last test item in block 821. If other items remain, the process continues through "NO" in block 823 to block 825, where the process clears the contents of the temporary specifications file and proceeds to the next record in Test Session Database 770. The process then returns to block 803, and the item counter is incremented by one and the process iterates.

If, in block 821, the process determines that the current test item is the last test item, the process continues to block 827, YES, and to block 829, where the file of test specifications is stored in the Database of Test Specifications 790 and is sent to testing session 900 (described below). The construction of the test format file process 800 then stops.

Testing Session

The Testing Session process 900 is shown in FIG. 9. The "User Interface" section above describes what the test-takers see at their computers and what happens when the test-takers respond to different test item formats and their options. The testing session process 900 gathers relevant specifications and data elements and parameters and correctly formats and presents the testing session to the test-taker.

The Testing Session Process 900 begins in block 901. The process continues with initializing of the variable number of formats presented (#FP) in block 903. Each test item in the test will have at least one format (e.g., T/F) that is stored in the Database of Test Item Formats 720. Each test item format is structured as a layer in the Multi-Layer User Selectable Electronic Testing System, one layer for each test format. For example, a test item constructed with two formats (such as MC and T/F, for example) will have two layers. In the example above concerning equilateral triangles, there are six different formats. Therefore, the equilateral triangle test item is said to have six layers. The formats stored in the Database of Test Item Formats 720 can evolve over time as new formats are created and old formats are retired.

After initializing the variable number of formats presented in block 903, in block 905 the process fetches data from the first of two sources, the file of test specifications from database 790. This file includes the specific content of the test which is being used for the current testing session. For each layer/format developed for the given test item, a different set of specifications is included (in block 909 below) and detailed in a separate record. In this example embodiment, the set of specifications includes the format type, the content of the test item, the specifications of the correct answer, a list of tracked metrics, and a list of global parameters to override. The format type of the layer can include MC, FITB, T/F, drawing an answer using a stylus, manipulation of objects on the screen (e.g., putting events in chronological order), and the like. The content of a test item can involve various presentation techniques, including text, graphics, audio, and video. The specifications of what constitutes a correct answer can include a list of choices for a multiple-choice test item, including which one is correct, alternate spellings for the answer to FITB test items, and algorithms for acceptable tolerances for drawn answers. Among the tracked metrics are latency, confidence, and hesitancy. The list of global parameters that it is possible to override include item value, format value, and changes in the text of labels.

The testing process continues in block 909 and fetches data from the second of the two sources, the stored item formats from database 720. In block 911, test item formats are read from the Database of Test Item Formats 720. This file includes a set of procedures and requirements for displaying each test format included in the current test.

For example, when the format of the item is fill-in-the-blank FITB, (e.g., "Who invented the cotton gin?") the text of the question (test item) will be displayed. When the question includes a graphic element (e.g., "What is the name of the tree pictured below?"), the text of the question will be displayed, the size of the graphic element will be read from the File of Test Specifications (from block 907), and the placement of the graphic element on the screen will be determined by test item format parameters (from block 911). Also displayed is a button providing an option to the test-taker to switch test formats. For example, the button can be labeled "Switch to Multiple Choice" (e.g., reference numeral 03 in FIGS. 1 and 2). When the test-taker selects this button 03, the screen will reformat using the file of test specifications from database 790 from block 907 and the file of test item formats from block 911 to a four-option multiple choice test item. The data tracking procedures for determining metrics such as latency, confidence, and hesitancy are adjusted to the new test item format.

Additionally in block 909, a timestamp is recorded and data are written. The timestamp establishes the tracking of the test-taker's response time as outlined above.

In block 913, the layering process continues as a check is made to determine if the number of available formats (#F) is greater than the number of formats presented (#FP). For test items with more than one test item format, the process continues to block 921 Yes. If this example had but one format, or if this were the final format option available to the test taker, the process would continue to block 915 No, and the final screen format would be fully defined as outlined below.

That is, the process would continue to block 917 where the test item would be constructed and displayed in the selected format without a button to select the option to go to the next format. The time for the test-taker to answer the test item or to otherwise respond to the displayed test item is tracked and stored. The system timestamps at the start of the presentation of the test item as a measure of the efficiency of the programming. This timestamp also marks the beginning of the interval that measures how long it takes the test-taker to answer the question and is used in computing latency, hesitancy, and other test-taker attributes that can be included in a performance profile.

When the test-taker answers the current question in block 919 another timestamp is made, which marks the end of the time interval it took for the test-taker to answer the question. This is also a measure of the test-taker's latency and hesitancy metrics that will be used in the analysis and reporting section below.

In block 929, the test-taker is then prompted to indicate their level of confidence in the correctness of their answer. When the test-taker selects a confidence level in block 931, a time stamp is entered to measure this interval.

In block 933, the data from the presentation and responses to the current test item are written as a completed item record to the Test Session Database 770 and another time stamp is recorded to measure this interval.

In block 935, the process inspects the file of test specifications from database 720 to determine whether the current test item is the last test item in the test. If the answer is "YES," the process continues to block 941 and in block 943, the test session ends. The session data file is assigned a unique name by the MUSET system and the file is stored in the Test Session Database 770. If the current test item is not the last test item, the process continues to block 937 "NO", and the next item in the file of test specifications is selected from database 790 in block 939, "Skip to Next Item and Go to Start."

The following section discusses an example of a multi-layered test item with three available formats (e.g., fill-in-the-blank FITB, multiple choice MC, and true/false T/F, which are in order of decreasing difficulty). When the process flow enters block 913 to determine if the number of available formats (#F) is greater than the number of formats presented (#FP), the number of formats is equal to 3 (#F=3) and the number of formats presented is equal to 1 (#FP=1). In this example instance, the process continues through "YES" in block 921, and the fill-in-the-blank (FITB) test item format is presented in block 923. The FITB test item format has the highest value (is most difficult). Since there is another format available (MC), a button to switch to that format is also presented and can include the text "Switch to a MC format."

In block 925 a determination is made "Did the test-taker T-T choose the alternate format?" If the answer is "NO" the process continues to block 927, and then to block 919, where the test-taker answers the test item. If the determination in block 925 is "YES," the process continues to block 951 Yes and to block 953, in which the number of formats presented (#FP) is incremented by 1 and the format specifications for multiple choice MC are acquired from the current item data (as in block 909). That is, the format and contents of the data are changed to reflect the chosen alternative format and the test item is updated with the format specifications. A timestamp is stored and the data are written in block 955, and the process returns to block 913.

In block 913, another check is made to determine if the number of available formats (#F) is greater than the number of formats presented (#FP). Because a T/F format is now available, the process continues to block 921 "Yes." The multiple choice MC item is then displayed in block 923, and the text of the alternative format selection button (reference numeral 03 in FIG. 1) changes to reflect that the test-taker can switch to a T/F test item format. If the test-taker switched to the T/F format in block 925 "Did the T-T (test-taker) choose the alternate format?" the process continues to block 951 as before and to block 953, in which the number of formats presented (#FP) is incremented by 1 and the format specifications for T/F are acquired from the current item data (as in block 909). That is, the format and contents of the data are changed to reflect the chosen alternative format and the test item is updated with the format specifications. A timestamp is again stored and the data are written in block 955, and the process returns to block 913.

As the process returns to block 913, another check is made to determine if the number of available formats (#F) is greater than the number of formats presented (#FP). This time, there are no additional formats available and the determination is made that the number of formats available (#F) is not greater than the number of formats presented (#FP), and the process continues to block 915 "NO" and the T/F format is presented without an option to switch to another format. As described above when only a single format was available, the process continues to block 917. In block 919 the test-taker answers the T/F question and in block 929 is prompted to select their level of confidence in their true/false answer. In block 931, the test-taker selects a level of confidence. In block 933, the data from the presentation and responses to the current test item are written to the Test Session Database 770 as time stamps are recorded throughout.

In block 935, a determination is made (by inspecting the File of Test Specifications in database 790) as to whether the current test item is the last item in the test. If the answer is "YES," the test session ends. The session data file is assigned a unique name by the system and the file is stored in the Test Session Database 770. If the current item is not the last item, the process continues to block 937 "NO", and the next item in the file of test specifications is selected from database 790 in block 939, "Skip to Next Item and Go to Start." This process iterates until the last item is completed and the test session ends and the session data file is assigned a unique name by the system and the file is stored in the Test Session Database 770.

Scoring Process

An example Scoring Process 1000 of the MUSET system 700 is shown in the flow diagram of FIG. 10. The scoring process synchronizes a testing session data file in conjunction with a test specifications file to create a results file. By synchronizing the files, the process can step through the (pairs of) files in sequence. The results file then matches the structure of the joined/synchronized files. For each test item (i.e., test question) in the testing session, there is a set of fields for each testing format. The fields can include the type of format, for example, fill-in-the-blank (FITB), multiple-choice (MC), and/or true/false (T/F), which types of format were chosen by the test-taker, and how long the test-taker took to make those choices. For each format, the fields also include the test-taker's answer, the time it took to answer, the test-taker's indicated level of confidence, a computed score for that item, and biometric information, if biometric information was collected.

The scoring process 1000 begins in block 1001 where testing parameters are passed to the scoring process 1000, and a unique session ID is created. In block 1003, an aggregated call is made to bring in one or more score result files from Test Session Database 770. In block 1005, one or more test item parameter files F1 are received and read from the Database of Global Parameters 730 in FIG. 7. The scoring process 1000 reads in a session data file F1 from the test-taker's responses to the Testing Session process 900 described in the section above. In block 1007, the session data file F2 that matches the received test item parameters file F1 is received from the Test Session Database 770. Synchronizing the files F1 and F2 allows the scoring process 1000 to step through the compilation of test items in sequence.

In block 1009, a link is created between the test item parameters file F1, the session data file F2, and a test session results data file F3 that is created on-the-fly in block 1011 based on the format and requirements of the test item parameters file (F1) and the session data file (F2). For example, the test session results data file F3 will match the structure of the joined files F1 and F2. For each test item in the testing session, there is a set of fields for each format in which to store the type of format (e.g., fill-in-the-blank FITB, multiple choice MC, true/false T/F), whether that particular type format was chosen to be answered, and how long the test-taker took to make that choice (if applicable). For the chosen format, additional fields are used to store the test-taker's answer, the time it took the test-taker to answer, the test-taker's indicated level of confidence, and the computed score for that test item. When biometric information is collected, one or more biometrics fields are also used to store the collected biometric information.

After the three files F1, F2, and F3, are linked in block 1009, the process continues to block 1013, where demographics and other factors (such as the test taker's login information, identification card swipe, biometric information, and the like) of the first test item in the test item parameters file F1 and the first test item in the session data file F2 are stored. This information can be stored in a buffer, hard drive, or other suitable memory or storage device where the information can be stored/retrieved/accessed by the scoring process 1000 and the other processes in accordance with the claimed invention. A counter is also initialized in block 1013.

In block 1015, the counter is incremented and the count is stored. In block 1017, the scoring process 1000 determines if the test-taker answered the test item, using the pair of test item parameters file F1 and session data file F2. If the test-taker answered this question, the process continues to block 1041 Yes. In block 1043, the process determines if the test taker answered the test item in the initially presented format (e.g., fill-in-the-blank, FITB). If the test-taker answered the test item in the initially-presented format, the test-taker's answer and indicated confidence level are noted, and the process continues to block 1045 Yes as described below. If the test-taker did not answer the test item in the initially presented format, the process continues to block 1047 No and then to block 1051 where the amount of time it took the test-taker to switch to the next testing format is computed and written to the buffer. The counter is incremented by 1. The process then returns to block 1043 where a determination is made as to whether the test-taker answered this test item in the (second) presented format. If the test-taker answered the test item in the second-presented format, the test-taker's answer and indicated confidence level are noted, and the process continues to block 1045 Yes. If the test-taker did not answer the test item in the second-presented format, the process continues to block 1047 No and then to block 1051 where the amount of time it took the test-taker to switch to the next testing format is computed and written to the buffer. The counter is again incremented by 1. The process then returns to block 1043 where a determination is made as to whether the test-taker answered this test item in the (third) presented format. If the test-taker answered the test item in the third-presented format, the test-taker's answer and indicated confidence level are noted, and the process continues to block 1045 Yes. If the test-taker did not answer the test item in the third-presented format, the process continues to block 1047 No and then to block 1051 where the amount of time it took the test-taker to switch to the next testing format is computed and written to the buffer. The counter is again incremented by 1. Depending upon the number of formats in which a test item can be presented, this process can continue until all possible formats are exhausted.

Once the test-taker provides an answer to a format of the test item, the test-taker's answer and indicated confidence level are noted, and the process continues to block 1045 Yes and then to block 1055 where the amount of time it took the test taker to answer this format of the test item is computed and written to the test session results data file F3.

The process continues to block 1057 where a test item score is calculated for the test item. The test item value is retrieved from the test item parameters file F1 and is used to determine the test item score. For example, a test item value can be a default multiplier value of 1.0, but can range from values lower than 1.0 for "easier" test items to values greater than 1.0 for more difficult test items. In block 1059, if the test-taker provided the correct answer to the test item, the item score is updated as the test item value.

In block 1061, the test item value is multiplied by a format value from the Database of Global Parameters 730. The format value can vary based upon the input of the test designer. For example, the format value can be 1.0 for a multiple-choice test item format and can be higher, for example 2.5, for fill-in-the-blank format. Similarly, lower format values can be used for true/false (T/F) item formats as described above. The product of the item value and the format value is computed and written to the test session results data file F3.

In block 1063, the product of the item value and the format value from block 1061 is multiplied by a confidence weighting value from the Database of Global Parameters 730. The confidence weighting value can also vary based upon the input of the test designer. For example, the confidence weighting value can be 1.0 for answers that the test taker indicated a high degree of confidence (e.g., very confident, sure) 0.5 for answers that the test taker indicated a moderate degree of confidence, and 0.0 for answers that the test taker indicated that they had no confidence or were just guessing. By indicating that they were just guessing for a particular test item, the item value can be 0, but it would remove any penalty for an incorrect answer. The product of the confidence weighting value and the product of the item value and the format value from block 1061 is computed and written to the test session results data file F3.

In block 1065, a partial-credit option can be included for test item answers that are close to the correct test item answer but are not an exact match. For example, in non-structured formats such as open-ended responses, the scoring system can include an option to assign partial credit for answers that include many of the attributes of the correct answer but are not an exact match. Misspelled words, incorrect punctuation, improper grammatical construction, and other determinations can be used to assess the value of the partial credit. A partial credit multiplier can then be used to further scale the test item score and the updated test item score can be written to the test session results data file F3.

Once the test item score is determined and the results used to update the test session results data file F3, the process returns to block 1023 where the test session results data file F3 is appended to store/record include the time, format, and test item score. The process then continues to block 1025 where the updated test session results file F3 is stored to the buffer, and the process continues to the next test item in the test item parameters file F1 and session data file F2, and the counter is reset.

If the test-taker did not answer this test item in block 1017, the process continues to block 1019 No and then to block 1021 where the scoring process 1000 computes the amount of time it took for the test-taker to choose not to answer the test item (before the test-taker indicated that they would change the format of the question or skip the question, for example). This amount of time can be used to determine hesitancy characteristics of the test-taker, as further described in the analysis and reporting processes described below.

The process then continues to block 1023 where the test session results file F3 is appended and updated to store/record the format selection and the time from block 1021. In block 1025, the updated test session results file F3 is stored to the buffer, and the process continues to the next test item in the test item parameters file F1 and session data file F2, and the counter is reset.

In block 1027, the scoring process 1000 determines if there are more test items to score. If there are more test items to score, the process moves to block 1029 Yes and then returns to block 1015 where the counter is incremented and the process continues (to block 1017). If the scoring process 1000 determines in block 1027 that there are no more test items to score, the process continues to block 1031 No and then to block 1033 where the scoring process is finalized and written to a database. For example, the aggregated data (i.e., all test items) from the test session results data file F3 is stored in the Test Session Database 770. The scoring process 1000 then stops in block 1035.

Administrative Processes

Administrative Processes used in the MUSET system 700 are shown in FIG. 7. The interconnected system components 720, 730, 740, 750, 760, 770 of the MUSET system 700 also show functional interactions of the components and processes that comprise the MUSET system. As outlined above, the system components can be discrete computer hardware components or can be integral parts of a single relational database with imbedded triggers and procedures that run on an integral computer system or a distributed computer system. In describing the administrative processes below, the system components are broken into logical component divisions.

FIG. 7 shows interactive connections between the Administrative Tools database 750 to the other system components. While a database representation 750 is shown, the system components that run the administrative tools processes include databases, computer processors, memory, firmware/software, and the like. The Administrative Tools 750 interact with the other system components. For example, Administrative Tools 750 can receive input data, including executable files, data files, client software, and the like from Legacy Systems 710.

Legacy Systems 710 can provide/include test item files created on a non-MUSET system to run now on the MUSET system. In this fashion, the MUSET system 700 can utilize test items (questions) created by other parties and modify the test items to include additional fields and capabilities offered by the MUSET system. For example, Administrative Tools 750 can receive from Legacy Systems 710 a set of legacy questions used in employment screening of public safety officers. The legacy questions can be modified and presented to public safety officer candidates, and their answers (including format and accuracy) and additional information (including measures related to confidence, hesitancy, and latency) can now be incorporated in the testing results to provide a better view of the candidate and how they measure up against hiring criteria (e.g., confidence, decisiveness, etc.) for that position. This preserves investments in older, legacy testing systems while increasing their value and utility through the enhanced capabilities of the MUSET system.

The legacy importing protocols in Legacy Systems 710 facilitate the exporting of the legacy items and the importing of that data into the MUSET system 700. The imported information can include the content of the legacy test items, including item stems, answers, and distractors. In addition, data such as historical data on item responses can be imported from the legacy systems.

Administrative Tools 750 within the MUSET system 700 include three general types: "add", "remove", and "modify". The add capabilities of the Administrative Tools 750 provide an operator the ability to specify a new element in one of the subsystems of the MUSET system 700. For example, an operator can add a new test or examination. Likewise, an operator can add a new test item to be used in an existing test or examination to the Database of Test Items 740 and Database of Global Parameters 730. The operator can also add a new item format that was not previously being used in the MUSET system to the Database of Test Item Formats 720. For example, a new item format could include placing historical events in chronological order. Additionally, an operator can add demographic elements and customer information to the system to provide additional information when building a test-taker profile.

Additional services, including translation services to a new language can also be added using Administrative Tools 750. Additional presentation capabilities, where test items are presented to test-takers in new formats (e.g., animated GIFs, CAD/CAM and schematic drawings, and the like), can also be added using Administrative Tools 750.

Likewise, additional capabilities for the Analytics and Reporting module 760 can be added using Administrative Tools 750. For example, a metric component can be added to the analysis process to provide normed results for demographic information not previously normed. Results formatting capabilities can also be added, such as for customized dashboards or other displays.

The remove capabilities of the Administrative Tools 750 provide an operator the ability to delete an element or elements that are no longer used from one of the subsystems of the MUSET system 700. Examples of elements that an operator may want to delete are similar to those that the operator would want to add described above. Administrative tools 750 include programmatic devices to ensure the referential integrity of the data systems. That is, Administrative Tools 750 include inspection algorithms to ensure referential integrity of the system when an element is removed. For example, one inspection algorithm in accordance with the claimed invention looks for instances of the removed element that can include requests to remove a test item on an active test, removal of a demographic variables used in active reports, and the like.

The modify capabilities of the Administrative Tools 750 provide an operator the ability to modify an element or elements currently in use in one of the subsystems of the MUSET system 700. Examples of elements that an operator may want to modify are similar to those that the operator would want to add or delete described above. Administrative Tools 750 include programmatic devices, such as inspection algorithms, to ensure the referential integrity of the data systems when an element is modified. For example, one inspection algorithm in accordance with the claimed invention performs an integrity check of the (proposed) modified element to ensure the as-modified element comports with database and process rules of the claimed MUSET system.

Administrative Tools 750 of the claimed invention allows an operator to prepare a test or examination for later administration. Likewise, an operator can aggregate test results to determine test item and aggregate test administration indices. Test items and overall examinations can be characterized and tracked. New test items can be tracked, evaluated, and added to existing examinations depending upon test-takers' responses and the determined efficacy of the test items. Older test items can be removed and retired once their efficacy declines or reaches a threshold level. Individual test items or entire examinations can be characterized and compared to one another to ensure fairness or equivalence based on a number of variables, such as test administration location, test administration time, test-taker grade, test-taker age, and the like. By collecting, tracking, evaluating, and refining test items and examinations, operators can provide customers with examinations best suited to characterize and build profiles of the test-takers.

Analytics and Reporting Processes

An Analytics and Reporting module 760 of the MUSET system 700 is shown in FIG. 7. Many of the system components, 720, 730, 740, 750, 770, interact either directly or indirectly with the Analytics and Reporting module 760. Analytics and Reporting module 760 can be the component of the MUSET system 700 that is most visible to the public, as it generates performance reports. Although many testing systems are able to determine if a test-taker's answer matches a preferred answer, the MUSET system 700 provides additional information and thus a more detailed and useful performance report. One of the valuable differentiators of the MUSET system 700 is that it is designed to present a performance profile rather than a simple test score. Traditional testing programs, such as the Scholastic Aptitude Test (SAT) and the American College Testing (ACT) test, are limited to simple scores that may range from a percentage of correct answers to a normed value or a range of scores. These traditional testing programs, however, are limited by the single dimension of their testing format. They lack the added dimensions of multiple-layered formats, test-taker confidence, latency, hesitancy, and biometrics measures. These added parameters support a rich set of metrics that add value and perspective to the reports developed from the MUSET system databases.

Confidence Ratio

One of the components of the performance profile generated by the MUSET system is a confidence ratio. The MUSET testing process requires test-takers to indicate their confidence in the accuracy of their answer. Test takers can indicate whether they are "very sure" of their answer, "moderately sure", or whether they are "just guessing". Other confidence level nomenclature can also be used as well, including "completely sure", "kind of sure", and "just guessing", or others such as "certain", "somewhat certain", or "uncertain". Additionally, the number of different confidence levels can also be changed for each particular test, each particular test format, and/or for each particular test item. A test-taker's confidence in the correctness of their answer may be a continuum from certitude to a random guess. The continuum can be divided into any number of discrete confidence levels, and those levels can be provided to assist in characterizing a test-taker's answer. For example, in some test formats, a choice between two different confidence levels may be shown and one may be selected by the test-taker, while in other test formats or test items, a choice between ten different confidence levels may be shown and one may be selected by the test-taker Regardless of the nomenclature and the number of discrete confidence levels from which to choose, the inclusion of a test-taker confidence indication mitigates or removes the concern that a correct answer was achieved by guessing. In addition, it allows for calculation of an average confidence in correctly answered items. For example, the correct answers can be weighted depending upon the level of confidence the test-taker had in the correctness of their answer to a test item. For example, a correct test item can be weighted 1.0 for "very sure" and by 0.75 for "moderately sure". A correct test item can be weighted by 0 when the test-taker indicated that they were "just guessing". A similar average confidence can be calculated for incorrect answers. When creating a performance profile and evaluating test performance, these confidence measures can enhance inferential judgements. An example below using the results in Table 1 illustrates the value of the confidence measures when creating a performance profile.

TABLE 1

| Test Item # | Test-Taker A | | | Test-Taker B | | |
| --- | --- | --- | --- | --- | --- | --- |
| | Correct/ Incorrect | Indicated Confidence | Weighted Confidence | Correct/ Incorrect | Indicated Confidence | Weighted Confidence |
| 1 | Correct | Very Sure | 1.0 | Correct | Very Sure | 1.0 |
| 2 | Correct | Very Sure | 1.0 | Correct | Very Sure | 1.0 |
| 3 | Correct | Moderately Sure | 0.5 | Correct | Very Sure | 1.0 |
| 4 | Incorrect | Just Guessing | 0.0 | Correct | Very Sure | 1.0 |

TABLE 1-continued

| Test Item # | Test-Taker A | | | Test-Taker B | | |
|---|---|---|---|---|---|---|
| | Correct/ Incorrect | Indicated Confidence | Weighted Confidence | Correct/ Incorrect | Indicated Confidence | Weighted Confidence |
| 5 | Correct | Very Sure | 1.0 | Correct | Very Sure | 1.0 |
| 6 | Correct | Very Sure | 1.0 | Incorrect | Moderately Sure | 0.5 |
| 7 | Correct | Very Sure | 1.0 | Correct | Very Sure | 1.0 |
| 8 | Incorrect | Moderately Sure | 0.5 | Correct | Very Sure | 1.0 |
| 9 | Correct | Very Sure | 1.0 | Correct | Very Sure | 1.0 |
| 10 | Incorrect | Just Guessing | 0.0 | Incorrect | Very Sure | 1.0 |

From the results shown in Table 1, Test-Taker A had 7 of the 10 test items correct for a percentage correct test score of 70%. Test Taker B had 8 of the 10 correct, receiving a test score of 80%.

If all we know about these two individuals are their test scores, we would determine that test-taker B performed better on the test than test-taker A. However, the addition of the confidence score allows a more informed perspective. Test-taker A indicated relatively higher confidence on questions that they answered correctly. That is, for test-taker A, their average confidence on correctly answered questions computes to 0.93 (seven correct questions with a weighted confidence total of 6.5). Their average confidence on incorrectly answered questions computes to 0.17 (three incorrect questions with a weighted confidence total of 0.5). This is a strong indication that test-taker A knows what they know and also knows what they do not know.

The same does not seem to be the case for test-taker B, who had an average confidence on correctly answered questions that was a perfect 1.00 (eight correct questions with a weighted confidence total of 8.0). However, their average confidence on incorrectly answered questions was only moderately lower at 0.75 (two incorrect questions with a weighted confidence total of 1.5). If the test was an employment screening instrument for candidates applying for a position as a security guard, the performance of test-taker B might be troubling in that they seem sure of themselves even when they are wrong. This is very apparent when the confidence ratio of test-taker A and the confidence ratio of test-taker B are compared. One example confidence ratio is expressed as the average confidence for correct answers divided by the average confidence for incorrect answers. The higher this ratio gets, the stronger the indication that the test-taker knows what they know and also knows what they do not know. In administering the test items, a sufficient number of responses are collected to allow for calculation of a confidence ratio. That is, additional test items are presented to the test taker to ensure that the test taker does not score 100 percent correct, or 0.0 percent correct.

From the data above in Table 1, the confidence ratios of test-taker A and test taker B can be calculated below and compared:

Test-taker A's confidence ratio =
$$\frac{\text{confidence ratio for correctly answered questions}}{\text{confidence ratio for incorrectly answered questions}}$$

Test-taker A's confidence ratio = $\frac{0.93}{0.17}$ = 5.47

Test-taker B's confidence ratio =
$$\frac{\text{confidence ratio for correctly answered questions}}{\text{confidence ratio for incorrectly answered questions}}$$

Test-taker B's confidence ratio = $\frac{1.00}{0.75}$ = 1.33

It may well be that the performance of Test Taker A is seen as preferable to that of Test Taker B, even though Test Taker B answered a higher percentage of the questions correctly.

The Confidence Ratio also directly answers the question of whether the test-takers are guessing when they choose a given correct answer. On a four-option multiple-choice item, if they are truly guessing and they indicate that they are, they get no credit for their answer but are not penalized for it either. If they are truly guessing, but indicate either high or moderate confidence, they will have only one chance in four of receiving full or partial credit for their answer, and will have three chances in four of receiving full or partial decrement to their score. If the test-taker is being less than truthful about their guessing, their Confidence Ratio will be much lower than it would be had they indicated that they were just guessing.

Further, the values used to interpret the performance profile of an airline pilot might be far different from those used to interpret the performance of a customer service representative. The MUSET system of the claimed invention provides different weighting capabilities based upon established criteria for the test-taking candidates.

Response Latency

The time it takes a test-taker to answer a question or to decide to select another testing format is another metric that the MUSET system of the claimed invention captures, measures, and incorporates into the performance profile. This decision time is referred to as latency. Test-takers who respond quickly to a question are described as demonstrating short latency, and test-takers taking appreciably more time to answer a question are described as demonstrating long latency. Test-takers who answer correctly, indicate high confidence in their answer, and have short latency are likely to be evaluated as high performers. These three factors (correctness/score, confidence, and latency/decisiveness) can be combined when building a test-taker performance profile. FIG. 6 shows a three-dimensional representation of the range of results for test-takers' overall score (correctness), confidence ratio, and latency.

The two-by-two-by-two cube 600 in FIG. 6 provides a visual representation of eight possible outcomes that can be included when building a test-taker's performance profile. In the cube 600 shown in FIG. 6, a test-taker's score, confidence, and latency are divided into low and high categories, and eight possible combinations (individual cubes) result. When additional measures are included, the test-taker's performance profile can include many additional combinations of test-taker attributes. For this example, performance profile cube 600 demonstrates one reasonable set of value judgments for test-takers on a given test. The eight possible combinations (individual cubes) in this example include low-score, short-latency, low-confidence cube 605, low-score, long-latency, low-confidence cube 610, high-score, short-latency, low-confidence cube 615, high-score, long-latency, low-confidence cube 620, high-score, short-latency, high-confidence cube 625, high-score, long-latency, high-confidence cube 630, low-score, short-latency, high-confidence cube 635, and low-score, long-latency, high-confidence cube 640 (not visible from the perspective view of FIG. 6).

Each of the individual cubes 605, 610, 615, 620, 625, 630, 635, and 640 can include a numerical value or other ranking to provide a performance profile measure. Different tests or different test evaluators may place different values on the different test-taker criteria (score, confidence, latency). For example, test evaluators that are evaluating test-takers for a sales position may place a high value on confidence and short latency while placing a lower premium on the test-taker's score. Evaluators seeking test-takers for an accounting job may place a higher value on the test-taker's score and short latency while placing a lower value on the test-taker's confidence. In this fashion, evaluators can build analyses scoring grids that represent relative importance of the tested factors for the position in question. Over time and experience, the analyses scoring grids can be refined to provide an accurate measure of previous test-taker's profiles as a predictive means for current test-takers.

Item Difficulty Ratio

The facility of the MUSET system 700 to present the test-taker with the option of switching to another testing format on a given test item is another of its advantages over traditional testing models. If the initial presentation of the test item is a fill-in-the-blank (FITB), an option can be presented to switch to a multiple-choice (MC) test item format. This affords the test-taker the option to select an easier format. It is demonstrably less demanding to select the correct answer from a list of four alternatives (MC) than it is to recall the answer from memory (FITB). Opinions differ on how these two formats vary in the degree of skill they demonstrate, but it is evident that recalling is significantly greater than selecting. As outlined above, the (test) format value (multiplier) provides a differential value for the alternative testing formats.

The differential value of these two formats can also vary with the way a skill is expected to be implemented. For example, two diesel engine mechanics might each be required to know how to diagnose and repair a clogged fuel line. However, if one diesel mechanic (i.e., test-taker) were in a garage working on a customer's truck and the other were a field mechanic in the army working in a combat zone, the ability to recall the procedures from memory would seem to be highly valuable for the field mechanic, while the mechanic in the garage might be able to recall and perform the procedures if they were able to look up the information in a manual on a shelf in the garage. The values assigned to the recall format might be expected to be differentially higher for the field mechanic than the values assigned to the selecting format of the mechanic in the garage. These values can be accounted for in the test format value multiplier.

As with the Confidence Ratio, the MUSET system of the claimed invention supports metrics in the performance profile that are derived from the value of the format the test-takers choose to answer. One example metric is the item difficulty ratio and is calculated from the values of the test item formats for items that were correctly answered contrasted to the values of the test item formats for items that were incorrectly answered. Table 2 below illustrates one example method of calculating an item difficulty ratio for test-taker A and test-taker B.

TABLE 2

| Item # | Test Taker A | | | Test Taker B | | |
|---|---|---|---|---|---|---|
| | Correct/ Incorrect | Format | Format Value | Correct Incorrect | Format | Format Value |
| 1 | Correct | Fill-in-the-blank | 2.5 | Correct | Multiple Choice | 1.0 |
| 2 | Correct | Fill-in-the-blank | 2.5 | Correct | Multiple Choice | 1.0 |
| 3 | Correct | Fill-in-the-blank | 2.5 | Correct | Multiple Choice | 1.0 |
| 4 | Incorrect | Multiple Choice | 1.0 | Correct | Multiple Choice | 1.0 |
| 5 | Correct | Fill-in-the-blank | 2.5 | Correct | Multiple Choice | 1.0 |
| 6 | Correct | Fill-in-the-blank | 2.5 | Incorrect | Fill-in-the-blank | 2.5 |
| 7 | Correct | Multiple Choice | 1.0 | Correct | Multiple Choice | 1.0 |
| 8 | Incorrect | True/False | 0.5 | Correct | True/False | 0.5 |
| 9 | Correct | Fill-in-the-blank | 2.5 | Correct | Multiple Choice | 1.0 |
| 10 | Correct | Fill-in-the-blank | 2.5 | Incorrect | Multiple Choice | 1.0 |

$$\text{Test-taker A's ave. format value (for correctly answered test item)} = \frac{\text{total format values for correctly answered questions}}{\text{total of correctly answered questions}}$$

$$\text{Test-taker A's ave. format value (for correctly answered test item)} = \frac{2.5 + 2.5 + 2.5 + 2.5 + 2.5 + 1.0 + 2.5 + 2.5}{8}$$

$$\text{Test-taker A's ave. format value (for correctly answered test item)} = \frac{18.5}{8} = 2.3125$$

$$\text{Test-taker A's ave. format value (for incorrectly answered test item)} = \frac{\text{total format values for incorrectly answered questions}}{\text{total of incorrectly answered questions}}$$

$$\text{Test-taker A's ave. format value (for incorrectly answered test item)} = \frac{1.0 + 0.5}{2}$$

$$\text{Test-taker A's ave. format value (for incorrectly answered test item)} = \frac{1.5}{2} = 0.75$$

$$\text{Test-taker A Item Difficulty Ratio} = \frac{\text{ave. format value for correctly answered test items}}{\text{ave. format value for incorrectly answered test items}}$$

$$\text{Test-taker A Item Difficulty Ratio} = \frac{2.3125}{0.75} = 3.08$$

$$\text{Test-taker B's ave. format value (for correctly answered test item)} = \frac{\text{total format values for correctly answered questions}}{\text{total of correctly answered questions}}$$

$$\text{Test-taker B's ave. format value (for correctly answered test item)} = \frac{1.0 + 1.0 + 1.0 + 1.0 + 1.0 + 1.0 + 0.5 + 1.0}{8}$$

TABLE 2-continued

| | Test Taker A | | | Test Taker B | | |
|---|---|---|---|---|---|---|
| Item # | Correct/ Incorrect | Format | Format Value | Correct/ Incorrect | Format | Format Value |

Test-taker B's ave. format value (for correctly answered test item) $= \dfrac{7.5}{8} = 0.9375$ Test-taker B's ave. format value (for incorrectly answered test item) $= \dfrac{\text{total format values for incorrectly answered questions}}{\text{total of incorrectly answered questions}}$ Test-taker B's ave. format value (for incorrectly answered test item) $= \dfrac{2.5 + 1.0}{2}$ Test-taker B's ave. format value (for incorrectly answered test item) $= \dfrac{3.5}{2} = 1.75$ Test-taker B Item Difficulty Ratio $= \dfrac{\text{ave. format value for correctly answered test items}}{\text{ave. format value for incorrectly answered test items}}$ Test-taker B Item Difficulty Ratio $= \dfrac{0.9375}{1.75} = 0.53571$ The item difficulty ratios can be interpreted in a number of ways. For example, in Table 2 above, test-taker A has an item difficulty ratio (IDR) that is relatively high, which could be interpreted to indicate that for topics for which test-taker A had knowledge, test-taker A was comfortable with the fill-in-the-blank (FITB) format, but if test-taker A did not know the FITB answer, switching to the multiple-choice (MC) format did not appreciably assist them in correctly answering the test item. The practical implications of this evaluation can be used to refine the test itself or to provide additional information to compare the test-taker's recall memory (used in fill-in-the-blank format tests) to the test-taker's recognition memory (used in multiple-choice tests).

Additionally, test-taker B appears to be a different type of candidate, where the item difficulty ratio (IDR) is well under 1.0. This IDR ration can provide information about test-taker B. For example, test-taker B may be risk averse and is not comfortable choosing the fill-in-the-blank test format option. Additionally, test-taker B could have limited recall skills and is not able to answer the fill-in-the-blank options. Further, test-taker B may not fully understand the impact of forgoing the fill-in-the-blank option on the test-taker's score, evaluation, and performance profile.

The MUSET system and methods provide multi-layer user-selectable cascading test formats to interactively adapt testing sessions to the test-taker on an item-by-item basis or on a series of items. The result is a dynamically-changing testing session that affords test-takers the ability to demonstrate their understanding, knowledge, skills, and abilities using different test item formats not possible in traditional testing environments. The systems and methods of the claimed invention collect, measure, and analyze data elements and parameters (e.g., test item format information, confidence measures, latency measures, hesitancy measures, biometric measures, and the like) as well as the underlying test item "answers" to transform a test item answer into a complete test item response files. The test item response files are used to build performance profiles to distinguish test-takers that may have the same "raw" test score. The performance profiles provide accurate and precise sets of test item data and test-taker data upon which educational, professional, employment, and personnel decisions can be made.

The claimed invention is:

1. A computer-implemented multi-layer user-selectable electronic testing method of building an electronic test-taker performance profile comprising executing on a computer processor the steps of:
   building a test specifications file with electronic test item content from a test item database;
   appending the test specifications file with an initial scoring parameters record that includes a scoring parameter of an electronic test item in an initial test item format and an alternative scoring parameters record that includes a scoring parameter of the electronic test item in an alternative test item format from a database of global parameters;
   automatically delivering an electronic test item in the initial test item format to a test-taker on a display device, wherein the electronic test item includes the test specifications file with the electronic test item content and the scoring parameters records;
   in response to receiving a selection from the test-taker to switch from the initial test item format to the alternative test item format, transforming the test specifications file with the initial scoring parameter to the alternative scoring parameter by selecting the alternative scoring parameters record in the test specifications file;
   automatically delivering the electronic test item to the test-taker in the alternative test item format;
   receiving an electronic test item response from the test-taker to the electronic test item delivered to the test-taker in the alternative test item format;
   storing the electronic test item response in an item response database;
   calculating a test item score for the received electronic test item response using the alternative scoring parameters record;
   receiving a test item response confidence indication indicating the test-taker's confidence of correctness of the electronic test item response;
   storing the test item response confidence indication in the item response database;
   automatically calculating a confidence based upon the received test item response confidence indication;
   determining an amount of time required for the test-taker to provide the selection to switch from the initial test item format to the alternative test item format and to provide the electronic test item response after the electronic test item was delivered to the test-taker in the alternative test item format;
   automatically calculating a latency score based upon the determined amount of time required for the test-taker to provide the selection to switch from the initial test item format to the alternative test item format and to provide the electronic test item response;
   determining a number of changes to the electronic test item response that the test-taker makes before the test taker submits the selection to switch from the initial test item format to the alternative test item format and to submit the electronic test item response for receipt;
   automatically calculating a hesitancy score based upon the number of changes to the electronic test item response that the test-taker makes; and
   building an electronic performance profile of the test-taker based upon a number of correct answers, the confidence of the electronic test item response, the latency score, and the hesitancy score.

2. A multi-layer user-selectable electronic testing process of claim 1 further comprising:
receiving demographic information of the test-taker; and further building the electronic performance profile of the test-taker based upon the demographic information.

3. A multi-layer user-selectable electronic testing process of claim 1 further comprising:
receiving biometric measurements of the test-taker; and further building the electronic performance profile of the test-taker based upon the biometric measurements.

4. A multi-layer user-selectable electronic testing process of claim 1, wherein the confidence level includes a confidence ratio calculated based upon the test-taker's indicated average confidence for correct answers and the test-taker's indicated average confidence for incorrect answers.

5. A multi-layer user-selectable electronic testing process of claim 1 further comprising:
creating a weighted computed score of the number of correct answers based upon a test item format value.

6. A multi-layer user-selectable electronic testing process of claim 1 further comprising:
creating a weighted computed score of the number of correct answers based upon an average test item difficulty value.

7. A multi-layer user-selectable electronic testing process of claim 6, wherein the average test item difficulty value is based upon a test item format value for test items that were correctly answered and a test item format value for test items that were incorrectly answered.

8. A multi-layer user-selectable electronic testing process of claim 1 further comprising: receiving a test item parameter file (F1) from a database of global parameters; receiving a testing session data file (F2) from a test session database; synchronizing the test item parameter file (F1) and the testing session data file (F2); creating a test session results file (F3) based on the test item parameters file (F1) and the session data file (F2), wherein test session results file F (F3) includes a type of a test item format, the amount of time required for the test-taker to provide the electronic test item response, the confidence level, and a computed score for the test item.

9. A multi-layer user-selectable electronic testing process of claim 8 further comprising:
updating the test session results file (F3) with the latency score.

10. A multi-layer user-selectable electronic testing process of claim 8 further comprising:
updating the test session results file (F3) with the hesitancy score.

11. A multi-layer user-selectable electronic testing process of claim 1
wherein calculating the test item score for the received electronic test item response using the scoring parameters record includes weighting the test item score by a format value.

* * * * *